US012600158B2

(12) United States Patent
Schäfer et al.

(10) Patent No.: US 12,600,158 B2
(45) Date of Patent: Apr. 14, 2026

(54) UNPRINTED ELECTROPHOTOGRAPHICALLY PRINTABLE FILLABLE POUCHES AND METHODS FOR PRODUCING AND PRINTING SAID POUCHES

(71) Applicant: Sihl GmbH, Düren (DE)

(72) Inventors: Manfred Schäfer, Cologne (DE); Steffen Ohr, Sursee (CH); Ronny Kunze, Schenkelberg (DE); Axel Niemöller, Düren (DE)

(73) Assignee: Sihl GmbH, Düren (DE)

( * ) Notice: Subject to any disclaimer, the term of this patent is extended or adjusted under 35 U.S.C. 154(b) by 497 days.

(21) Appl. No.: 18/209,132

(22) Filed: Jun. 13, 2023

(65) Prior Publication Data

US 2023/0398766 A1 Dec. 14, 2023

(30) Foreign Application Priority Data

Jun. 14, 2022 (EP) .................................... 22179070
Mar. 16, 2023 (EP) .................................... 23162419

(51) Int. Cl.
*B41M 5/00* (2006.01)
*B41M 5/50* (2006.01)
*B41M 5/52* (2006.01)

(52) U.S. Cl.
CPC .......... *B41M 5/504* (2013.01); *B41M 5/0047* (2013.01); *B41M 5/506* (2013.01); *B41M 5/508* (2013.01); *B41M 5/5218* (2013.01); *B41M 5/5227* (2013.01)

(58) Field of Classification Search
CPC .... B41M 5/504; B41M 5/0047; B41M 5/506; B41M 5/508; B41M 5/5218; B41M 5/5227; B65D 75/5805
See application file for complete search history.

(56) References Cited

U.S. PATENT DOCUMENTS 5,281,504 A 1/1994 Kanbayashi et al.
5,354,634 A 10/1994 Misuda et al.
8,186,827 B2 5/2012 Kubota et al.
(Continued)

FOREIGN PATENT DOCUMENTS

EP 0501360 A1 9/1992
EP 0507255 A1 10/1992
(Continued)

*Primary Examiner* — Peter L Vajda
(74) *Attorney, Agent, or Firm* — The Webb Law Firm

(57) ABSTRACT

The present invention is directed to an unprinted electrophotographically printable fillable pouch made of an unprinted electrophotographically printable film including (a) a multilayer polymer film including a base layer (a1) and a sealing layer (a2) which is the inner layer of the pouch and (b) at least one toner-receiving layer as the outer layer deposited on the multilayer polymer film (a) from an aqueous coating composition including (b1) a polymeric binder, (b2) fine inorganic particles, and (b3) coarse inorganic and/or organic particles. Also provided is a method for producing the unprinted pouches on a pouch making machine as well as a method for printing the pouches in an electrophotographic printing process. The printed pouch is ideal to be filled with food, pet food, beverages, pharmaceuticals and/or personal care product.

18 Claims, 3 Drawing Sheets

(56) References Cited

U.S. PATENT DOCUMENTS

| | | | |
|---|---|---|---|
| 9,555,655 B2 | 1/2017 | Sugiura et al. | |
| 11,400,744 B2 | 8/2022 | Schäfer et al. | |
| 2008/0008846 A1 | 1/2008 | Zhou et al. | |
| 2012/0225223 A1 | 9/2012 | Takahashi et al. | |
| 2019/0070821 A1 | 3/2019 | Kohn et al. | |
| 2019/0152209 A1 | 5/2019 | Ikeda et al. | |
| 2020/0094535 A1* | 3/2020 | Schäfer | B32B 27/08 |

FOREIGN PATENT DOCUMENTS

| | | | |
|---|---|---|---|
| EP | 0770230 | B1 | 8/2000 |
| EP | 2033804 | A2 | 3/2009 |
| EP | 3000611 | A1 | 3/2016 |
| EP | 3450195 | A2 | 3/2019 |
| EP | 3492271 | A1 | 6/2019 |
| EP | 3628505 | A1 | 4/2020 |
| JP | H11309800 | A | 11/1999 |

* cited by examiner

UNPRINTED ELECTROPHOTOGRAPHICALLY PRINTABLE FILLABLE POUCHES AND METHODS FOR PRODUCING AND PRINTING SAID POUCHES

CROSS-REFERENCE TO RELATED APPLICATIONS

This application claims priority to European Patent Application Nos. 22 179 070.2 filed Jun. 14, 2022 and 23 162 419.8 filed Mar. 16, 2023, the disclosures of which are hereby incorporated by reference in their entireties.

BACKGROUND OF THE INVENTION

Field of the Invention

The present invention relates to an unprinted electrophotographically printable fillable pouch prepared from an unprinted electrophotographically printable film, a method for producing said pouch, a method for printing said pouch with dry-toner based printing and a combined method of producing and printing a fillable pouch.

Description of Related Art

Packaging, such as tubes, pouches or other flexible containers made from printed flexible films are widely used in the packaging sector. In particular, pouches used in the food or pet food sector needs to fulfill specific conditions with regard to sealing properties, stability, and food conformity of the material.

So far, flexible printable films are printed for example with electrophotographic printing and the roll-to-roll printed material is usually then converted into the desired shape of the packaging such as a pouch. EP 3 450 195 A2 generally describes flexible and semi-rigid packaging material that can be digitally printed with ink or toner before or after formed into the final product, e.g. a polyethylene food pouch. EP 0 507 255 A1 and EP 0 501 360 A1 are both directed to electrophotographically printable recording materials though not necessarily for packaging applications. EP 0 507 255 A1 concerns an electrostatic image transfer recording sheet which comprises a substrate having an image-forming layer made of a porous alumina hydrate. EP 0 501 360 A1 discloses a laminate film for receiving a toner image comprising an absorbing layer which contains fine inorganic particles.

However, the electrophotographically printed surfaces of the film material are often susceptible to scratches or other damages when folded, stretched, or bent during the pouch production, often requiring varnishing or lamination of the printed surface before pouch production. In the absence of an additional finishing layer, e.g. an overprint varnish, there is also the risk of toner debris from the electrophotographically printed surface on the backside of the film material—typically stored in reels—before pouch making due to insufficient toner adhesion. This set-off may be critical as regard to food compliance because the backside of the film will become the inside of the pouch. In addition, the customization of print designs for small lot sizes of pouches, which is becoming increasingly popular in the packaging industry, is not easy to achieve if a film material has to be printed before the pouches are formed.

Furthermore, pouches used in the food or pet food sector to contain larger volumes of products of up to 3 l must be made from a dimensional stable and tear-resistant film material to avoid damage to and deformation of the pouch.

SUMMARY OF THE INVENTION

There is a need for electrophotographically printable pouches to be used in the food or pet food sector, which are produced from a flexible material before being printed and which combine good machinability on commercial pouch making and printing machines and high-quality printability in electrophotographic dry-toner based printing processes. In addition, such a concept would be ideal for small lot sizes of pouches, in particular with the increasingly popular flexible and customized print designs. Conformity of the pouch material as contact material for food, pet food, beverages, pharmaceuticals, and personal care products is essential if used accordingly.

This need is met by an unprinted electrophotographically printable fillable pouch made of an unprinted electrophotographically printable film comprising: (a) a multilayer polymer film comprising a base layer (a1) and a sealing layer (a2) which is the inner layer of the pouch and (b) at least one toner-receiving layer as the outer layer deposited on the multilayer polymer film (a) from an aqueous coating composition comprising: (b1) a polymeric binder, (b2) fine inorganic particles having a median particle size ($D_{v50}$) of from 50 to 300 nm, and (b3) coarse inorganic and/or organic particles having a median particle size ($D_{v50}$) of from 3 to 14 μm, wherein the unprinted electrophotographically printable film has an average surface roughness Rz of from 3.0 to 12.0 μm.

This need is also met by an unprinted electrophotographically printable fillable pouch made of an unprinted electrophotographically printable film comprising: (a) a multilayer polymer film comprising a base layer (a1) and a sealing layer (a2) which is the inner layer of the pouch and (b) at least one toner-receiving layer as the outer layer deposited on the multilayer polymer film (a) from an aqueous coating composition comprising: (b1) a polymeric binder, (b2) fine inorganic particles having a median particle size ($D_{v50}$) of from 50 to 300 nm, and (b3) coarse inorganic and/or organic particles having a median particle size ($D_{v50}$) of from 3 to 14 μm, wherein the coarse inorganic and/or organic particles have a specific pore volume of from 1.3 to 2.5 ml/g.

This need is also met by an unprinted electrophotographically printable fillable pouch made of an unprinted electrophotographically printable film comprising: (a) a multilayer polymer film comprising a base layer (a1) and a sealing layer (a2) which is the inner layer of the pouch and (b) at least one toner-receiving layer as the outer layer deposited on the multilayer polymer film (a) from an aqueous coating composition comprising: (b1) a polymeric binder, (b2) fine inorganic particles having a median particle size ($D_{v50}$) of from 50 to 300 nm, and (b3) coarse inorganic and/or organic particles having a median particle size ($D_{v50}$) of from 3 to 14 μm., wherein the coarse inorganic and/or organic particles have an oil absorption value of from 220 to 400 g/100 g.

The present invention is also directed to a method for producing unprinted electrophotographically printable fillable pouches from the unprinted electrophotographically printable film on a pouch making machine, comprising the steps of: (m-1) providing one or more webs of the unprinted electrophotographically printable film which are preferably unwound from one or more reels; (m-2) moving the web(s) of the unprinted electrophotographically printable film in a longitudinal direction; (m-3) converting the web(s) of the unprinted electrophotographically printable film into a pouch precursor web having a desired shape by folding and/or stacking the web(s) with the toner-receiving layer (b) as outer layers of the pouch precursor web and optionally integrating a bottom; (m-4) sealing the pouch precursor web to obtain a web of pouches, (m-5) cutting off the pouches from the web; and (m-6) optionally stacking the pouches.

The present invention is further directed to a method for printing the unprinted electrophotographically printable fillable pouch comprising the step of dry-toner based electrophotographic printing at least one main surface of the pouch.

The method of the present invention of producing an electrophotographically printable fillable pouch before the printing process combines the advantages of avoiding damage to the printed surface and printing small lot sizes even with personalized designs with less effort. The pouches prepared from an unprinted electrophotographically printable film of the present invention show excellent printability, perfect adhesion of toner, have pleasant haptic properties which are required for customer satisfaction and enable the feeding of the pouches from stack in the printing process. The method of the present invention wherein the already finished pouch is printed further reduces waste of already printed material and prevents the risk of set-off to the backside of the film material, which is particularly important for packaging of food, pet-food or beverages.

DESCRIPTION OF THE INVENTION

Figure 1:
FIG. 1 shows an unprinted electrophotographically printable fillable stand-up pouch according to the invention on the left and the printed, filled inventive stand-up pouch on the right.

As used herein, the term "unprinted electrophotographically printable film" refers to a film which is not printed in any way so far and is capable of receiving a dry toner image. The unprinted electrophotographically printable film comprises a multilayer polymer film (a) comprising a base layer (a1) and a sealing layer (a2) below the base layer (a1). Throughout this application the term "layer" is used to encompass both the layers of a coextruded polymer film and the layers of a polymer laminate which can also be referred to as "films". The multilayer polymer film (a) can be a coextruded polymer film or a laminated polymer film. As used herein, the term "laminated polymer film" includes laminates of polymeric films and laminates of polymeric and one or more non-polymeric films, e.g. metal foils. One or more of the single polymeric films of the laminate can also be a multilayer coextruded polymeric film. The single layers of the laminated polymer film can be laminated to each other using heat, pressure, and/or adhesive.

The multilayer polymer film (a) can be translucent or opaque, preferably it is white opaque or metallic opaque. The multilayer polymer film (a) typically has a thickness of from 60 to 300 μm, preferably from 75 to 250 μm, more preferably from 80 to 200 μm, and most preferably from 85 to 130 μm.

The multilayer polymer film (a) comprises a base layer (a1). The base layer (a1) can be any polymeric material that can be processed to a film. The base layer (a1) may also consist of two or more coextruded sublayers.

The base layer (a1) may be a non-sealable polymer layer (a1i). The non-sealable polymer layer (a1i) may be a biaxially oriented polymer film (a1i-1), which typically comprises a thermoplastic material. Useful thermoplastic materials are selected from polyesters, polyolefins, polystyrenes, polyamides, and blends and copolymers thereof. Preferably the thermoplastic material is selected from poly(ethylene terephthalate)s (PET), poly(ethylene naphthalate)s, polylactides (also referred to "poly(lactic acid)"—PLA), polypropylenes (PP), polyamides, and blends and copolymers thereof. The most preferred biaxially oriented polymer films (a1i-1) are biaxially oriented polypropylenes (BOPP) such as BOPP films available from Innovia Films under the tradename Rayoface®, and biaxially oriented poly(ethylene terephthalate)s (BOPET) such as BOPET films available from Mitsubishi Polyester Film GmbH under the tradename Hostaphan®, from DuPont under the tradenames Mylar® and Melinex®, and from Polyplex Corporation Ltd./Transparent Paper Ltd. under the tradename Sarafil®. The biaxially oriented polymer film (a1i-1) can be transparent, translucent or opaque, e.g., white or metallic opaque. Suitable films can be foamed, cavitated, or dyed in the mass, e.g., with a white pigment. The surface(s) of biaxially oriented polymer film can be treated, e.g., by corona treatment, flame treatment, or chemical treatment. The treatment of the surface can have various effects such as an improvement of wettability and adhesion to the adjacent toner-receiving layer, especially in the case of BOPP films, and thus in an increase of composite strength.

The non-sealable polymer layer (a1i) may also be a non-oriented polymer layer (a1i-2), preferably a regenerated cellulose layer or a cellulose acetate layer. The cellulose acetate layer may be a layer of cellulose monoacetate, diacetate or triacetate or any combination thereof.

As used herein, the term "regenerated cellulose" refers to a class of well-known polymers formed by precipitation of cellulose from its solution, such as from wood, cotton, hemp or other sources. Regenerated cellulose may be prepared by viscose process including first derivatizing cellulose with carbon disulfide and sodium hydroxide to an alkali-soluble sodium cellulose xanthan, commonly known as viscose, which is further dissolved in dilute sodium hydroxide. The viscose liquid is extruded into a bath of sulfuric acid and sodium sulfate to reconvert it to solid cellulose resulting regenerated cellulose after completion of the viscose process, which is called cellophane, when the regenerated cellulose is in film form. Suitable examples of regenerated cellulose films include NatureFlex™ films, such as NatureFlex™ NK White, NatureFlex™ NKM, NatureFlex™ NVS White, NatureFlex™ XS, and Cellophane™ films, such as Cellophane™ WSBZ and Cellophane™ XS, all available from Futamura Group (Great Britain).

The thickness of the base layer (a1) is typically within the range of from 8 to 80 μm, preferably from 12 to 60 μm.

The multilayer polymer film (a) according to the present invention further comprises a sealing layer (a2), which is the inner layer of the pouch. As used herein, the term "inner layer" refers to the layer of the polymer film which is the final layer of the polymer film on the inside of the pouch. As used herein, the term "sealing layer" refers to a layer composed of a material that due to its nature can be joined with a similar or dissimilar material using sealing methods such as heat-sealing, i.e., a temperature above room temperature (23° C.), or ultrasonic sealing, and optionally also pressure. The sealing layer (a2) of the present invention can typically be sealed by a heat-sealing or an ultrasonic sealing process. Preferably, the sealing layer (a2) is heat-sealable, i.e., sealable at a temperature above room temperature (23° C.). In particular, the sealing layer (a2) has a heat sealing temperature in the range of from 120 to 220° C., preferably from 130 to 200° C., more preferably from 140 to 190° C., and most preferably from 150 to 180° C. Herein, the heat sealing temperature is defined as the temperature at the inflection point in a graph of maximum seal strength versus temperature (also "sealing curve" in the following). The measuring points are obtained by contacting two webs or sheets of the multilayer film (a) with their sealing layers (a2) (which will become the inner layer of the pouch), sealing at different temperatures of the sealing jaws as recorded by a temperature sensor within the jaws and measuring the maximum seal strength according to DIN 55529:2012-09. The following sealing conditions are applied: sealing pressure 25 N/cm 2, sealing time 0.5 s, width of the seal seam: 20 mm, sealing jaws coated with PTFE and dimensions of 20 mm×100 mm. The maximum seal strength is obtained as the average of 3 measurements performed at 3 stripes cut from one sample and recorded by a tensile tester perpendicular to the seal seam by using a constant peeling angle of 90° and a constant peeling speed of 100 mm/min, after 1 h conditioning in standard climate (23° C./50% relative humidity). Typical maximum seal strength values for the inventive pouches are between 10 and 60 N/15 mm, preferably between 15 and 50 N/15 mm and more preferably between 20 and 50 N/15 mm. It has been shown that sealing layers (a2) of the multilayer film (a) having a heat sealing temperature within the above ranges avoid blocking or pre-sealing of the inner surfaces of the pouch in the electrographic printing and fixing process.

The sealing layer (a2) can be constructed from one single polymer or a blend or other combination of polymers, e.g. in the form of different polymer sublayers. The sealing layer (a2) may comprise a not biaxially oriented polyamide (PA); a polyethylene polymer (PE), such as high density polyethylene (HDPE), low density polyethylene (LDPE), linear low density polyethylene (LLDPE), ultra linear low density polyethylene (ULLDPE), metallocene based LLDPE (mLLDPE); a polyethylene copolymer, such as ethylene (meth) acrylic acid copolymer (EAA and EMAA), e.g. Surlyn™ polymers from Dow, ethylene methyl acrylate (EMA), ethylene-vinyl acetate copolymer (EVA), ethylene butyl acrylate (EBA); a polypropylene, including metallocene based polypropylene, such as cast polypropylene (cPP) or blown polypropylene (blown PP); a polypropylene copolymer (including terpolymers), such as a propylene/ethylene copolymer; (co)polyesters, such as amorphous poly(ethylene terephthalate) (APET), not biaxially oriented glycol-modified poly(ethylene terephthalate) (PET-G); or not biaxially oriented polylactides (PLA), e.g. cast polylactide (cPLA); poly(vinylidene chloride); poly(vinylchloride); poly(vinyl acetate); a poly(meth)acrylate; or any copolymer, blend or other combination thereof. The sealing layer (a2) itself can already be a multilayer polymer film such as a coextruded polymer film, e.g. a coextruded polymer film comprising polypropylene and polypropylene copolymer or a coextruded polymer film comprising polyethylene homopolymer and polyethylene copolymer, such as a cast or blown coextruded polymer film comprising polypropylene homopolymer and polypropylene copolymer or a cast or blown coextruded polymer film comprising polyethylene homopolymer and polyethylene copolymer. The sealing layer (a2) can have 2, 3 or more, typically extruded, polymer film layers such as one core layer and two skin layers. Such 3-layer sealing films are commercially available. Preferably, the sealing layer (2*a*) is a cast or preferably blown polymer film comprising polymer(s) derived from propylene incl. propylene homo- and copolymers. More preferably, the sealing layer (2*a*) is a cast or preferably blown, typically extruded, 3-layer polymer film comprising polymer(s) derived from propylene such as a polypropylene homopolymer core layer and two polypropylene copolymer skin layers. A simultaneous biaxial orientation of the blown film can be achieved by the double or triple bubble coextrusion process.

The base layer (a1) and the sealing layer (a2) may be a monomaterial. As used herein, the term "monomaterial" means that both layers (a1) and (a2) are completely or substantially composed of a single type of polymer. Herein, "substantially composed of a single type of polymer" means that at least 70 wt. %, such as at least 80 wt. %, such as at least 90 wt. % of the polymers of the material are the same type of polymer. Typical monomaterials that can be used in the present invention are polypropylene or poly(ethylene terephthalate) monomaterials. For example, the base layer (a1) is a BOPP film and the sealing layer (a2) is a cast or blown PP film, or the base layer (a1) is a BOPP film and the sealing layer (a2) is a cast or blown coextruded multilayer film comprising polypropylene homopolymer and polypropylene copolymer, or the base layer (a1) is a BOPET film and the sealing layer (a2) is an APET or PET-G film.

The sealing layer (c) may have a thickness of from 8 to 120 μm. In case the multilayer polymer film (a) is a laminated polymer film, the sealing layer (a2) preferably has a thickness of from 25 to 120 μm, more preferably from 30 to 90 μm. In case the multilayer polymer film (a) is a coextruded polymer film, the sealing layer (a2) preferably has a thickness of from 8 to 25 μm.

The multilayer polymer film (a) of the present invention may further comprise at least one intermediate layer (a3). The intermediate layer (a3) may be located on top or below the base layer (a1) or on both sides of the base layer (a1). The intermediate layer (a3) can have various effects. The thickness of the intermediate layer (a3) can range of from 10 nm to 10 μm. Typically, the intermediate layer (a3) is an adhesion promoting layer or a tie layer. An adhesion promoting layer improves the wettability of the base layer (a1) and its adhesion to the adjacent toner-receiving layer (b) or any other adjacent layer and thus results in an increase of composite strength. An adhesion promoting layer on top of the base layer (a1) and adjacent to the toner-receiving layer (b) may be subjected to a corona treatment. The adhesion promoting layer, preferably positioned between the base layer (a1) and the toner-receiving layer (b), may comprise a polymer selected from poly(meth)acrylates, copolymers comprising units derived from (meth)acrylates, poly(vinyl acetate)s, polyurethanes, polypropylene copolymers, such as polypropylene terpolymers, and blends of these polymers. Biaxially oriented polymer films (a1i-1), such as BOPP or BOPET films, already coated with an adhesion promoting layer are commercially available, e.g., Hostaphan® RNK 2CSR from Mitsubishi Polyester Film GmbH or coated Sarafil® films available from Polyplex Corporation Ltd./Transparent Paper Ltd., such as Sarafil® S42 and Sarafil® TW102. An intermediate layer (a3) whose purpose is to bond neighboring layers of limited compatibility in a coextruded film is also referred to as a tie layer.

The unprinted electrophotographically printable film according to the present invention may further comprise a barrier layer (a4). The barrier layer (a4) can be located between the base layer (a1) and the sealing layer (a2) or between two base layers (a1). The barrier layer (a4) may be a metal or metal oxide, a metal or metal oxide coated polymeric carrier film, a metal foil or a polymer film having barrier properties. The metal oxide coated polymeric carrier films are preferably $AlO_x$ or SiOx coated polymeric carrier films, such as $AlO_x$ or SiOx coated PP, PET, or PLA films. Typically, the barrier layer (a4) is a polymer film comprising an ethylene/vinyl alcohol copolymer (EVOH) or a polyamide (co) polymer, an aluminum foil or a copper foil; preferably the barrier layer is an aluminum foil. The barrier layer (a4) may have a thickness of from 6 to 30 μm, preferably from 7 to 25 μm. More preferably, the barrier layer is an aluminum foil having a thickness of from 7 to 15 μm.

The base layer (a1) may also consist of coextruded sublayers comprising two core layers (a11) and a central barrier layer (a4), and optionally intervening tie layers (a3).

In case the multilayer polymer film (a) is a laminated polymer film, the layers (a1) to (a4) can be laminated to each other by any laminating process using conventional laminating adhesives, such as dry lamination with either aqueous (water-based) or solvent-based adhesives; solvent-free lamination with 1-component or 2-component adhesive systems; hot-melt lamination with hot-melt adhesives or extrusion glues, e.g. on the basis of polyolefins, and lamination with radiation-curable adhesives. Preferred adhesives are water-based or solvent-free adhesives based on polymers or prepolymers such as poly(meth)acrylates and polyurethanes. The adhesive may contain additional components such as crosslinking agents, plasticizers, tackifiers, and colorants. The type of adhesive, including type and amount of additives, used for lamination depends on the intended use of the multilayer laminate. In case of use as a food packaging material the relevant legal regulations for food must be observed. The adhesive is typically applied in an amount of from 0.5 g/m 2 to 10 $g/m^2$, preferably from 1 $g/m^2$ bis 6 $g/m^2$.

According to the present invention the unprinted electrophotographically printable film comprises at least one toner receiving layer (b). If the film comprises more than one toner-receiving layers at least the outer layer has the features and properties described herein for the toner-receiving layer (b). As used herein, the term "toner-receiving layer" refers to a coating provided over the multilayer polymer film (a) as an outer layer of the unprinted electrophotographically printable film, which is capable of receiving a dry toner image. As used herein, the term "outer layer" refers to the top layer of the polymer film and to the outside of the unprinted electrophotographically printable fillable pouch. The toner-receiving layer (b) is coated over the multilayer polymer film (a), typically over the base layer (a1) or any optional intermediate layer (a3), wherein the dry coating weight of the toner-receiving layer may be in the range of from 6 to 27 $g/m^2$, preferably from 10 to 25 $g/m^2$, and more preferably from 15 to 24 $g/m^2$.

The at least one toner-receiving layer (b) is deposited from an aqueous coating composition comprising a binder (b1), fine inorganic particles (b2) having a median particle size ($D_{v50}$) of from 50 to 300 nm, and coarse inorganic and/or organic particles (b3) having a median particle size ($D_{v50}$) of from 5 to 14 μm. Unless otherwise stated, the median particle size ($D_{v50}$) of both the fine and coarse particles is determined herein by laser diffraction according to ISO 13320:2020-01, for example on a LS 13320 device from Beckman Coulter. As used herein, the median particle size refers to the size of the particles as they exist in the aqueous coating composition, i.e., the median particle size ($D_{v50}$) as used herein means the median size ($D_{v50}$) of the dispersed particles.

As the polymeric binder (b1) according to the present invention any polymeric binder known for use in preparing toner-receiving layers (b) can be used. Typically, the polymeric binder (b1) comprises a water-soluble polymeric binder.

The polymeric binder may comprise poly(vinyl alcohol); poly(vinyl alcohol) derivatives; poly(ethylene oxide); poly (vinylmethylether); cellulose derivatives, such as methylcellulose, ethylcellulose, and carboxymethylcellulose; polyvinylpyrrolidone, or any combination thereof.

Preferably, the polymeric binder (b1) comprises poly (vinyl alcohol), poly(vinyl alcohol) derivatives or any combination thereof. Poly(vinyl alcohol) or a derivative thereof may be used as the sole polymeric binder (b1) in the toner-receiving layer (b), i.e. no other polymer is present in the toner-receiving layer (b) apart from any optional polymeric particles as described below.

The term "poly(vinyl alcohol)" is generally acknowledged in the art as a completely or partially hydrolyzed polyvinyl acetate. The degree of hydrolysis attributed to a poly(vinyl alcohol) designates the degree of hydrolysis of the poly(vinyl acetate) in accordance with standard practice. The degree of hydrolysis is from 80 to 99 mol %, preferably from 86 to 98 mol %. The degree of hydrolysis (saponification) H indicates what percentage of the basic poly(vinyl acetate) molecules is "saponified" to poly(vinyl alcohol). From the residual acetyl group content and thus the ester value EV, H is calculated by using the following formula:

$$H \text{ in mol } \% = \frac{100 - 0.1535 \cdot EV}{100 - 0.0749 \cdot EV} \cdot 100$$

A degree of hydrolysis of 100% means, therefore, that the poly(vinyl alcohol) has no acetyl groups. The term "ester value" (EV) connotes the number of mg KOH needed to neutralize the acid released from the ester by saponification in 1 g of substance. It is determined in analogy to DIN 53401 as follows: Approximately 1 g of poly(vinyl alcohol) is weighed into a 250-ml round-bottomed flask and mixed with 70 ml distilled water and 30 ml neutralized alcohol, then heated with reflux until it dissolves. After cooling it is neutralized against phenol phthalein with 0.1 n KOH. When neutralization is complete, 50 ml 0.1 n KOH are added and the mixture is boiled for 1 hour with reflux. The excess caustic solution is back-titrated in the heat with 0.1 n HCl against phenolphthalein as indicator until the coloration fails to recur. A blank test is carried out at the same time.

$$\text{Ester value } (EV) = \frac{(a - b) \cdot 5.61}{E}$$

a=consumption of ml 0.1 n KOH b=consumption of ml 0.1 n KOH in the blank test

E=weighed quantity of poly(vinyl alcohol) (dry)

The degree of hydrolysis of the poly(vinyl alcohol) has to be understood as an average value, meaning that mixtures of less hydrolyzed and more hydrolyzed poly(vinyl alcohol)s can be used as well. Typically, the weight average molecular weight of the poly(vinyl alcohol) is at least 100.000 g/mol, more preferably at least 120.000 g/mol, and most preferably at least 150.000 g/mol, as determined by gel permeation chromatography using polystyrene standards combined with static light scattering (absolute method) on re-acetylized specimen. Re-acetylization is performed by standard methods known in the art, e.g., in a pyridine/acetic anhydride mixture. Suitable examples of poly(vinyl alcohol) include, but are not limited to, Poval™ grades, e.g. Poval™ 40-88, Poval™ 56-88, Poval™ 25-98 R, Poval™ 26-88, Poval™ 30-92, and Moviol® grades, e.g. Mowiol® 40-88, available from Kuraray.

The aqueous coating composition from which the toner-receiving layer (b) is deposited may comprise a crosslinking agent (b4). Suitable crosslinking agents for use in the present invention include boric acid, borate, dialdehydes such as glyoxal, glyoxylic acid, salts of glyoxylic acid such as sodium or calcium salts, dihydrazides such as adipic acid dihydrazide, di- or polyols such as methylol melamine, urea glyoxyl resin or urea glyoxal resins, compounds having silanol groups and any combinations thereof.

In case poly(vinyl alcohol) is used as the polymeric binder (b1), preferred crosslinking agents (b4) comprise boric acid and/or borate. The toner-receiving layer (b) may comprise boron in an amount of >0 and less than 60 $mg/m^2$, preferably less than 40 $mg/m^2$, more preferably less than 30 $mg/m^2$, and most preferably less than 20 $mg/m^2$ in the dry coating. The toner-receiving layer (b) may be prepared according to the method described in EP 3 628 505 A1.

In addition to a water-soluble polymeric binder, such as the water-soluble polymeric binders described above, the polymeric binder (b1) may comprise a water-dispersed polymeric binder, such as a water-dispersed cationic and/or nonionic polymeric binder. However, it is preferred that one or more water-soluble binders are the sole polymeric binder (b1).

The aqueous coating composition from which the toner-receiving layer (b) is deposited further comprises fine inorganic particles (b2) having a median particle size ($D_{v50}$) of from 50 to 300 nm, preferably 65 to 200 nm, more preferably from 80 nm to 180 nm. The particles size distribution is preferably unimodal. The fine inorganic particles (b2) are aggregates of primary particles which are dispersed in the aqueous coating composition, i.e., the median particle size ($D_{v50}$) as used herein with respect to the fine inorganic particles (b2) means the median primary aggregate size ($D_{v50}$).

The fine inorganic particles (b2) can comprise any inorganic particle suitable and/or commonly used for porous coatings. Preferably, the fine inorganic particles (b2) provide a microporous toner-receiving layer.

Typically, the toner-receiving layer has a porosity (pore volume) of from 0.2 to 2.0 ml/g. The porosity of the toner-receiving layer (b) is determined by contacting the toner-receiving layer (b) of the unprinted film sample with 1-methoxy-2-propanol in order to fill the pores of the toner-receiving layer (b) with the liquid and calculating the pore volume from the weight difference of the dry coating and the 1-methoxy-2-propanol saturated coating after removing excess liquid from the surfaces using a density of 0.92 g/cm 3 for 1-methoxy-2-propanol. The porosity in ml/g can be determined according to the following definition: porosity of the layer=liquid uptake into the pore volume in $ml/m^2$/coating weight of the microporous layer in $g/m^2$.

With "microporous" is meant that the pores between the particles, within particle aggregates and/or the particles and the binder have a pore size (diameter) in the range of from 2 nm to less than 0.5 μm, preferably in range of from 5 nm to less than 0.2 μm, even more preferred in the range from 10 nm to 100 nm as can be measured by mercury intrusion porosimetry.

The fine inorganic particles (b2) according to the present invention may have a BET surface area of from 100 to 400 $m^2/g$. Unless otherwise stated, the BET surface area is determined herein by gas adsorption according to ISO 9277:2010. Typically, the weight ratio of fine inorganic particles (b2) to binder (b1) is within the range of from 3:1 to 25:1. The exact weight ratio of (b2) to (b1) in the aqueous coating composition and thus in the respective toner-receiving layer (b) is selected based on the type of fine inorganic particles.

Preferred fine inorganic particles (b2) for preparing the toner-receiving layer (b) comprise alumina, such as fumed alumina; aluminum oxide hydroxide, such as boehmite and pseudoboehmite; aluminum hydroxide; cationically surface-modified silica, such as cationically surface-modified fumed silica and cationically surface-modified colloidal silica obtained by a wet chemical process, and any combinations thereof. The fine inorganic particles (b2) are more preferably selected from boehmite, cationically surface-modified fumed silica, fumed alumina, and combinations thereof, even more preferably from boehmite and cationically surface-modified fumed silica, and combinations thereof. Most preferably the fine inorganic particles (b2) are boehmite particles.

Boehmite is a mineral of aluminum with an orthorhombic unit cell (a=3.693 Å, b=12.221 Å, and c=2.865 Å), classified as aluminum oxide hydroxide (γ-AlO(OH) (=$Al_2O_3{\cdot}H_2O$)). Its crystal structure consists of double layers of oxygen octahedrons with a central aluminum atom. The outfacing oxygen is bonded via hydrogen bonds to the hydroxyl group of the adjacent layer of octahedrons. Due to the weak bonds, boehmite is prone to intercalation, that is, the inclusion of small molecules, usually water, in between these layers. This causes a larger spacing in [010] direction and a perfect cleavage perpendicular to the general direction of the hydrogen bonding. Boehmite with an increased spacing in the [010] direction is referred to as pseudoboehmite and amorphous boehmite is usually referred to as gel. Pseudoboehmite is characterized by a higher water content ($Al_2O_3{\cdot}x\,H_2O$ ($1.0<x<2.0$). Boehmite can be found in nature or precipitated and grown from solution of aluminum salts and alumina under hydrothermal conditions. Boehmite particles within the meaning of the present invention are small primary aggregates of boehmite crystallites (primary particles).

Favorably, the boehmite crystallites are not needle-shaped, preferably they are tabular and more preferably have an average aspect ratio of 3.0 or more and 10 or less and a tabular surface with a major axis-to-horizontal ratio of 0.60 or more and 1.0 or less. The aspect ratio can be determined by a method disclosed in Japanese Patent Publication No. 5-16015. The aspect ratio is herein expressed as the ratio of the diameter to the thickness of a particle. The term "diameter" as used herein refers to the diameter of a circle having the same area as the projected area of a particle of the alumina hydrate as observed with a microscope or an electron microscope (equivalent circle diameter). The major axis-to-minor axis ratio of the tabular surface is defined as the ratio of the minimum diameter to maximum diameter of the tabular surface as observed with a microscope in the same manner as described for the aspect ratio.

The small primary aggregates of boehmite crystallites can be obtained by dispersion of secondary larger agglomerates of boehmite crystallites having a mean particle size in the range of from 1 μm to 100 μm present in commercially available boehmite powders, e.g., as delivered from a spray drying process. The primary aggregates may have a porous structure. The boehmite particles may have specific pore volume of from 0.5 to 1.5 ml/g, preferably from 0.8 to 1.3 ml/g. Unless otherwise stated, the specific pore volume is determined herein by means of nitrogen sorption according to the methods of Barrett, Joyner and Halenda (BJH) and Gurwitsch as described in DIN 66134:1998-02.

The boehmite particles may have a BET specific surface area of from 100 to 200 $m^2/g$, preferably from 120 to 180 $m^2/g$. The specific pore volume and the BET specific surface area are determined on the powder after calcination at 550° C. for 3 h.

Suitable commercially available boehmite powders to be used as fine inorganic particles (b2) in the toner-receiving layer (b) include DISPERAL® and DISPAL® grades available from Sasol, e.g., HP8, HP10, HP14, and HP18, preferably HP14.

When boehmite particles are used as the fine inorganic particles (b2), the weight ratio of boehmite particles to binder (b1) may be within the range of from 7:1 to 25:1, preferably from 7.5:1 to 20:1, and more preferably from 8:1 to 12:1. Moreover, the toner-receiving layer (b) may have a porosity of from 0.3 to 1.5 ml/g, preferably from 0.35 to 1.2 ml/g, more preferably from 0.4 to 1.0 ml/g, most preferably from 0.5 to 0.8 ml/g measured as described above.

When boehmite particles are used as the fine inorganic particles (b2), the aqueous coating composition from which the toner-receiving layer (b) is deposited may comprise (b5) an acidic dispersing agent, preferably being an organic and/or inorganic acid having a $pk_a$ value lower than 5.0; more preferably an inorganic or organic acid having a $pk_a$ value of less than 2.0, such as HCl, HBr, $HNO_3$, formic acid, acetic acid, propionic acid, lactic acid, and sulfamic acid, and any combinations thereof. The acidic dispersing agent (b5) may be used in an amount of from more than 0 to 10 wt. %, preferably from 1 to 5 wt. %, each based on the amount of the fine inorganic particles (b2).

The fine inorganic particles (b2) may further comprise cationically surface-modified silica particles. Typically, the cationically surface-modified silica particles are cationically surface-modified fumed silica particles derived from fumed silica particles, such as Aerosil® 200, Aerosil® 255, Aerosil® 300 from Evonik, Cab-o-Sil® M-3, Cab-o-Sil® M-5 from Cabot and HDK® grades from Wacker. Suitable fumed silica particles may have a BET specific surface area in the range of from 100 $m^2/g$ to 400 $m^2/g$, preferably from 200 $m^2/g$ to 300 $m^2/g$. Furthermore, the fine inorganic particles (b2) may be cationically surface-modified colloidal silica obtained by a wet chemical process such as derived from colloidal silica commercially available under the tradename Snowtex® from Nissan Chemical Ind., Ltd.

The surface of the silica particles has been rendered cationic by modification with a cationizing agent in order to improve dispersibility of the particles in the aqueous coating composition. The cationization agent is typically selected from aluminum salts, e.g., aluminumhydroxid chloride; cationic polymers, e.g. PDADMAC, polyvinylamin; and aminosilanes, e.g. 3-aminopropyltriethoxysilane, 3-aminopropyltrimethoxysilan, N-2-aminoethyl-3-aminopropyltrimethoxysilane, and n-butyl aminopropyl trimethoxysilane.

When cationically surface-modified silica particles are used as the fine inorganic particles (b2), the weight ratio of silica particles to binder (b1) may be within the range of from 3:1 to 15:1. Moreover, when the fine inorganic particles are cationically surface-modified silica particles, the toner-receiving layer (b) may have a porosity of from 0.5 to 2.0 ml/g measured as described above.

The fine inorganic particles (b2) may also be alumina particles, preferably fumed alumina particles, such as fumed alumina particles like Alu-oxide C® from Evonik, or fumed alumina particles originating from Aerodisp® W type dispersions based on fumed alumina from Evonik, such as Aerodisp® W 925, Aerodisp® W 630, Aerodisp® W 440. Suitable fumed alumina particles may have a high BET specific surface area in the range of from of from 50 $m^2/g$ to 150 $m^2/g$, preferably from 85 $m^2/g$ to 115 $m^2/g$. The weight ratio of alumina particles to binder (b1) may be within the range of from 10:1 to 20:1. When alumina particles are used as fine inorganic particles (b2) for preparing the toner-receiving layer (b), the porosity of the layer (b) may be of from 0.2 to 1.2 ml/g measured as described above.

Moreover, mixtures of the above mentioned fine inorganic particles can be used as the fine inorganic particles (b2) for preparing the toner-receiving layer (b).

The aqueous coating composition from which the toner-receiving layer (b) is deposited further comprises coarse inorganic and/or organic particles (b3) having a median particle size ($D_{v50}$) of from 3 to 14 μm, preferably from 5 to 13 μm, more preferably from 6 to 13 μm, and most preferably from 7 to 12 μm. The coarse particles (b3) as used in the present application may be inorganic particles, organic particles or a combination of both.

The coarse particles (b3) used in the present invention may have a specific pore volume of from 1.3 to 2.5 ml/g, preferably from 1.5 to 2.3 ml/g, more preferably from 1.7 to 2.1 ml/g. The coarse inorganic and/or organic particles (b3) used in the present application may further have an oil absorption value of from 220 to 400 g/100 g, preferably from 230 to 380 g/100 g, more preferably from 240 to 360 g/100 g. Unless otherwise stated, the oil absorption value is herein determined according to DIN EN ISO 787-5:1995-10.

Typically, the coarse particles (b3) are selected from inorganic particles comprising aluminum oxides; aluminum oxide hydroxides, such as boehmite or pseudoboehmite; silica, such as precipitated silica and gel type silica; and any combinations thereof and organic particles comprising polymeric particles such as particles comprising a polymer selected from polymers and copolymers of ethylene, propylene, styrene, tetrafluoroethylene, and (meth)acrylates, such as poly(methylmethyacrylate) and styrene/methylmethacrylate copolymer, polyamides, polyesters, polymethyl ureas, and starch, such as rice or corn starch, and any combinations thereof. The coarse particles may be any combination of the forgoing inorganic or organic particles. Typically, the coarse particles (b3) are spherical particles.

Suitable examples of polymeric particles used as coarse organic particles (b3) include, but are not limited to, polyamide powders/polymers and copolymers prepared by polymerising laurolactam (PA12) and/or caprolactam (PA6) commercially available under the trademark Orgasol® from Arkema (France), polymethyl urea polymers exemplified by Pergopak® M2 commercially available from Ablemarle Corporation or Deuteron PMH C from Deuteron GmbH.

The coarse particles (b3) are preferably inorganic particles selected from aluminum oxides; aluminum oxide hydroxides, such as boehmite or pseudoboehmite; silica, such as precipitated silica and gel-type silica; and any combinations thereof; more preferably silica particles and most preferably the coarse particles (b3) are gel-type silica particles. Gel-type silicas are also referred to as amorphous silicas and gel-type silica particles can be obtained by milling dried silica gel having a quasi-endless sponge structure to the desired particle size. Examples that can be used in the present invention include Gasil® HP type particles, such as Gasil® HP 39, Gasil® HP 255, Gasil® HP 270, Gasil® HP 280 commercially available at PQ Corporation, and Silcron® G-100 commercially available at Millenium Chemicals.

The most preferred coarse particles (b3) according to the present invention are gel-type silica particles having a specific pore volume of from 1.3 to 2.5 ml/g, preferably from 1.5 to 2.3 ml/g, more preferably from 1.7 to 2.1 ml/g, and/or an oil absorption value of from 220 to 400 g/100 g, preferably from 230 to 380 g/100 g, more preferably from 240 to 360 g/100 g.

According to the present invention, the coarse particles (b3) may be comprised in the toner-receiving layer (b) in a maximum amount of 20 wt. %, preferably in an amount of from 2 to 5 wt. %, based on the total dry weight of the toner-receiving layer (b).

The presence of the coarse particles (b3) in the toner-receiving layer (b) of the present invention results a in surface with specific properties which are advantageous in the pouch production process, the following electrophotographic printing process as well as in the final application of the pouch. In case of a transparent multilayer polymer film, the coarse particles (b3) add haze to the pouch so that the goods may be hardly visible. The coarse particles (b3) also lead to a structured, relatively rough surface having medium gloss. The resulting printed and unprinted surface has excellent haptic properties, i.e. a non-sticky feel, and a pleasant look. The dynamic coefficient of friction of the toner-receiving layer (b) which has been shown to be one important parameter for feeding the material in the pouch production and electrophotographic printing process can be easily adjusted by selecting the type and amount of coarse particles (b3) in the toner-receiving layer (b).

In order to prepare the aqueous coating composition for forming the toner-receiving layer (b) the components are typically mixed by conventional lacquer manufacturing means. Preferably, the fine inorganic particles (b2) and the coarse particles (b3) are dispersed in cold or hot water by means of strong agitation or high shear mixing devices, e.g. with rotor-stator principle, optionally in the presence of a dispersing agent. This leads to a dispersion with the required particle size for a homogeneous coating. Typically, the polymeric binder (b1), such as poly(vinyl alcohol), is separately dissolved in water and heated for full dissolution to temperatures of from 70° C. to 100° C. The particle dispersion and binder solution are mixed together in order to obtain an aqueous coating composition. If used, dispersed polymeric binders can be mixed additionally into the aqueous coating composition. The optional crosslinker can be added at any stage of the preparation process. Typically, the aqueous coating composition has a solids content of from 10 to 40 weight %, preferably from 20 to 35 weight %. A typical pH value is within the range of from 2 to 6, preferably from 3 to 5.

The aqueous coating composition can be coated onto the multilayer polymer film by any conventional coating method known in the art. For example, the aqueous coating composition can be applied by means of a curtain coater, a die coater, a roll coater, an air coater, a knife coater, a blade coater, a rod coater, a bar coater, or a comma coater. Application by a curtain coater, such as a curtain coater having one or multiple dies, with coating speeds of e.g. 100 to 200 m/min is preferred. Afterwards, the coating is typically dried at a temperature of from 30° C. to 130° C. for example in air impingement drying ovens.

In case the multilayer polymer film is a laminated polymer film, the aqueous coating composition is typically applied to the base layer (a1) or an optional intermediate layer (a3) to form the toner-receiving layer before the layers are laminated to further layers to prepare the laminated multilayer polymer film.

The unprinted electrophotographically printable film according to the present invention may have an average surface roughness Rz of from 3.0 to 12.0 μm, preferably from 4.0 to 10.0, as determined on the surface of the toner-receiving layer (b) according to DIN EN ISO 4287:2010-07 with a sampling length ln of 4.0 mm and a single sampling length Ir of 0.8 mm as defined in DIN EN ISO 4288:1998-04 with a 2 μm probe tip and an aperiodic profile setting, for example on a MarSurf PS 10 available from Mahr GmbH, Göttingen, Germany.

Typically, the unprinted electrophotographically printable film further has an arithmetic average roughness Ra of from 0.5 to 2.0 μm, also determined as described above for the average surface roughness Rz.

The unprinted electrophotographically printable film may exhibit a dynamic coefficient of friction (CoF) of the surface of the toner-receiving layer (b) to itself (film to film) in a range of from 0.30 to 0.60 such as from 0.30 to 0.50. Unless otherwise stated, the coefficient of friction is herein determined on the surface of the toner-receiving layer (b) according to ISO 8295:1995 but with a 1 kg weight at 300 mm/min drawing speed.

Typically, the toner-receiving layer (b) is a non-transparent layer. When the multilayer film is a transparent film having a haze value of no more than 5%, the unprinted electrophotographically printable film preferable has a haze value of more than 25%, more preferably at least 30% and most preferably at least 40% as determined according to ASTM D1003, Procedure A.

It is further preferred that the unprinted electrophotographically printable film has a gloss of from 10 to 30 gloss units as determined on the surface of toner-receiving layer (b) at 60°. Unless otherwise stated, the gloss is herein determined according to ISO 2813:2014.

The unprinted electrophotographically printable film may have a tear resistance of at least 1 N in machine direction (MD) and cross direction (CD), preferably at least 1.5 N in MD and at least 2.0 N, more preferably at least 4.0 N in CD. Unless otherwise stated, the tear resistance is herein determined according to ISO 6383-1:2015-12.

The toner-receptive layer (b) can be in direct contact with the multilayer polymer film (a), or there might be further layers applied between the toner-receiving layer (b) and multilayer polymer film (a).

It is understood that the above-mentioned additional layers can be present in any feasible combination and sequence with the proviso that the toner-receiving layer (b) is the outer layer and the sealing layer (a2) is the inner layer of the pouch. Moreover, the electrophotographically printable film according to the present invention may comprise further layers which are not specifically discussed herein. Non-limiting exemplary sequences of layers of the unprinted electrophotographically printable film include:

BOPET (a1)/blown PP (a2) laminate:

| layers | thickness/ coating weight |
| --- | --- |
| toner-receiving layer (b) | 22 g/m$^2$ |
| optionally: adhesion promoting layer (a3) | 0.1 g/m$^2$ |
| BOPET film (a1i-1) (white or transparent) | 23 μm |
| optionally: adhesion promoting layer (a3) | 0.1 g/m$^2$ |
| laminating adhesive | 3 g/m$^2$ |
| aluminum foil (a4) | 7-9 μm |
| laminating adhesive | 3 g/m$^2$ |
| blown PP sealing film (a2) | 55 μm |

BOPET (a1)/cPP (a2) laminate:

| layers | thickness/ coating weight |
| --- | --- |
| toner-receiving layer (b) | 22 g/m$^2$ |
| optionally: adhesion promoting layer (a3) | 0.1 g/m$^2$ |
| BOPET film (a1i-1) (white or transparent) | 23 μm |
| optionally: adhesion promoting layer (a3) | 0.1 g/m$^2$ |
| laminating adhesive | 3 g/m$^2$ |
| aluminum foil | 7-9 μm |
| laminating adhesive | 3 g/m$^2$ |
| cPP sealing film (a2) | 30-60 μm |

BOPP (a1)/cPP (a2) laminate (monomaterial for option B)

| layers | thickness/ coating weight |
| --- | --- |
| toner-receiving layer (b) | 22 g/m$^2$ |
| optionally: adhesion promoting layer (a3) | 0.1 g/m$^2$ |
| BOPP film (white or transparent) (a1i-1) | 50 μm |
| optionally: adhesion promoting layer (a3) | 0.1 g/m$^2$ |
| laminating adhesive | 3 g/m$^2$ |
| option A: aluminum foil (a4) or | 7-9 μm or |
| option B: AlOx or SiOx on BOPP film (a4) | 15-25 μm |
| laminating adhesive | 3 g/m$^2$ |
| cPP sealing film (a2) | 30-60 μm |

BOPP (a1)/blown PP (a2) laminate (monomaterial):

| layers | thickness/ coating weight |
| --- | --- |
| toner-receiving layer (b) | 22 g/m$^2$ |
| optionally: adhesion promoting layer (a3) | 0.1 g/m$^2$ |
| BOPP film (white or transparent) (a1i-1) | 50 μm |
| optionally: adhesion promoting layer | 0.1 g/m$^2$ |
| laminating adhesive | 3 g/m$^2$ |
| blown PP sealing film (a2) | 30-60 μm |

coextruded film (monomaterial) with barrier layer, e.g. blown film:

| layers | thickness/ coating weight |
| --- | --- |
| toner-receiving layer (b) | 22 g/m$^2$ |
| adhesion promoting layer: (PP homopolymer - preferably transparent) (a3) | 10-20 μm |
| BOPP core layer (a11) (white or transparent) | 20-30 μm |
| optionally: tie layer (a3) | 2-6 μm |
| EVOH polymer barrier layer (a4) | 3-10 μm |
| optionally: tie layer (a3) | 2-6 μm |
| BOPP core layer (a11) (white or transparent) | 20-30 μm |
| sealing layer (PP co/terpolymer - preferably transparent) (a2) | 10-20 μm |

The blown and cast PP sealing films are not restricted to polypropylene homopolymer but include multilayer polymers film comprising polymer(s) derived from propylene incl. propylene homo- and copolymers such as a 3-layer polymer film of polypropylene copolymer/PP homopolymer/polypropylene copolymer as described before.

According to the present invention, the term "pouch" is used interchangeably with the term "bag". The pouch according to the present invention typically has two printable main surfaces. As used herein, the term "main surface" refers to the front or back side of the pouch. The pouch preferably is a flexible pouch. As used herein, the term "flexible pouch" refers to pouches which are not formed from rigid material. Typically, the pouch is closeable, preferably sealable such as by means of heat and/or ultrasound. Preferred pouches according to the present invention are pouches which have an inwardly folded bottom or an inserted bottom which can be made of the unprinted electrophotographically printable film or a different polymeric film. The bottom of the pouch is not meant to be a main surface according to the present invention. When folded flat, the pouch preferably has a maximum of 8 film layers, more preferably a maximum of 4 film layers in the bottom area. The bottom area means the part of the flat folded pouch that includes the bottom. The up to 8, preferably 4 film layers can be only layers of the unprinted electrophotographically printable film (in case of an inwardly folded bottom or an inserted bottom made of the unprinted electrophotographically printable film) or layers of the unprinted electrophotographically printable film (such as 2 layers) and also layers (such as 2 layers) of a different polymeric material (in case a different polymeric material is used as the inserted bottom). The maximum thickness of the pouch when folded flat may be in the range of from 200 to 1200 μm, preferably 600 μm, and more preferably to 500 μm.

The pouch according to the present invention may be selected from a stand-up pouch, as for example shown in FIG. 1, a flat bottom bag, flat bottom gusset bag, and a flat bottom side gusset bag. Preferably, the pouch is a stand-up pouch such as a round seal stand-up pouch (Doyen type pouch) or a K-seal stand-up pouch. A stand-up pouch can have an inwardly folded bottom or inserted bottom as described above. The pouch may further comprise one or more optional features selected from a window; reclosable means such as a zipper (including a slider closure with end clip (zip lock) and a press-to-close zipper), a hook-and-loop fastener (velcro closure), and a cold-sealable adhesive strip; a Euro hole; notches such as one or more tear notches; perforations; a thin valve; an opening for spouts or valves. In cases where the pouch comprises reclosable means or a thin valve, the overall thickness of the pouch including the reclosable means or the thin valve is in the range of from 500 to 1500 μm. The overall thickness refers to the thickness of the pouch when the pouch is folded and not filled with any goods. The filling volume of the pouch may range of from 100 ml to 3 l.

In particular, the inventive electrophotographically printable pouches according to the present invention are suitable to package of liquids or solids, such as food, pet food, beverages, pharmaceuticals, personal care products, electronic parts, toys, lubricating oil, or gifts, preferably food, pet food, beverages, pharmaceuticals and/or personal care products.

The present invention further relates to a method for producing unprinted electrophotographically printable fillable pouches from the unprinted electrophotographically printable film on a pouch making machine, comprising the steps of: (m-1) providing one or more web of the unprinted electrophotographically printable film which are preferably unwound from one or more reels; (m-2) moving the web(s) of the unprinted electrophotographically printable film in a longitudinal direction; (m-3) converting the web(s) of unprinted electrophotographically printable film into a pouch precursor web having a desired shape by folding and/or stacking of the web(s) with the toner-receiving layer (b) as outer layers of the pouch precursor web and optionally integrating a bottom; (m-4) sealing the pouch precursor web, preferably by means of heat and/or ultrasound, to obtain a web of pouches (m-5) cutting off the pouches from the web; and (m-6) optionally stacking the pouches.

The pouch produced by the method according to the present invention may be any of the pouches described above. Pouch making machines are commercially available, e.g. from Mamata Machinery Pvt. Ltd, Totani Corporation, and Karlville Development, LLC.

More than one web may be used in the method for producing the pouches. Two webs of the unprinted electrophotographically printable film may be fed, e.g. a second web to form the body of the pouch (two faces of the pouch are prepared from two webs) and/or optionally a third web to form an inserted bottom. It is understood that two webs can be provided from one reel by unwinding and dividing the broader web into two narrower webs prior to converting step (m-3). Also, a web of a different material may be provided and typically unwound from a reel, e.g. to form an inserted bottom or a window.

Cutting off the pouches from the web in step (m-5) is to be understood broadly to also encompass punching out the pouch shapes from a broader web and/or trimming the edges of the web. The converting step (m-3) of the method for producing pouches may comprise the integration of a bottom which can be formed from a further web of the unprinted electrophotographically printable film or from a web of a different polymeric material. Moreover, one or more of steps (m-3) to (m-5) may comprise the integration of one or more of the optional features described above when referring to the pouch. These features may be integrated into the single pouch shapes of the pouch precursor web individually or in any combination at different stages in the process, as it is practical from a production standpoint. A zipper, for example, can be placed inside the single pouch shape near the future open side opposite of the bottom in converting step (m-3) and sealed in step (-m-4). Euro holes, notches, and perforations are typically punched in in the cutting step (m-5).

The pouch prepared according to the method of the present invention is fillable either via the thin valve, the opening for spouts or valves, if present, or at least a part of one side of the pouch is open of filling, which is the preferred embodiment. The at least partially open side of the pouch is typically on the opposite side of the bottom and can be obtained advantageously by not or incomplete sealing one side of the pouch precursor in step (m-4) or by cutting off a closed side (which can be folded or sealed) of the pouch in step (m-5).

Figure 2:
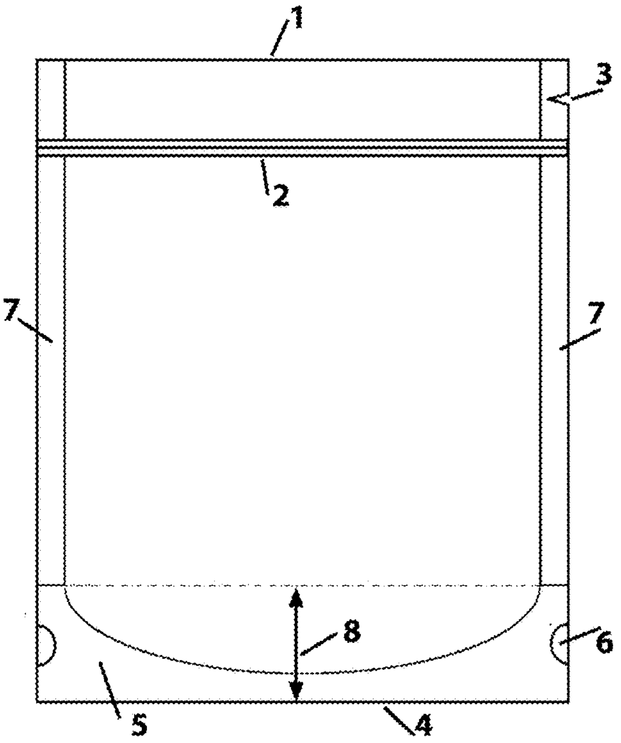
FIG. 2 is a drawing of an inventive stand-up pouch showing the sealing areas.

FIG. 2 is a top view drawing of a flat folded round seal stand-up pouch. The area above the zipper 2 towards the open side 1 of the pouch includes the area for the subsequent sealing of the pouch after it has been filled. This future sealing area will be located above tear notch 3. Opposite the open end 1 of the pouch is the bottom 4 having bottom fold seals 5 (second bottom fold seal on the back side not visible) and two gusset seals 6. The bottom gusset inside the pouch is not visible and has bottom gusset height 8. Side seals 7 are also shown.

In a method for producing the preferred stand-up pouches the converting step (m-3) comprises folding the web into a flat double web form and folding in a gusset for the bottom. For example, the web of the unprinted electrophotographically printable film is passed through a set of rakes folding a W-shaped gusset in the bottom 4 so that the future filled pouch can stand. The sealing step (m-4) comprises sealing the folded web in several sealing steps to create side seals 7 in a vertical orientation relative to the longitudinal direction of the web as well as bottom seals. The bottom seals include the seals of the bottom folds (bottom fold seals 5) and seals that hold the gusset together at its ends (gusset seals 6). The gusset seals 6 may join together the gussets ends only partially allowing the spreading of bottom fold seals 7 to enable a more stable stand of the pouch. The gusset seals 6 are often prepared by punching out semicircular areas from the bottom gusset to seal together the inner sealing layers (a2) of the unprinted electrophotographically printable film of the faces of the pouch shape in the bottom area. If a zipper has been integrated in step (m-3) it is sealed to the inside of the pouch shape, i.e. to the sealing layer (a2) of the unprinted electrophotographically printable film. The cutting step (m-5) comprises cutting off the pouches vertically along a central line through the common side seal area of two adjacent pouches and optionally cutting off excess material at the edges of the web.

According to the present invention, all steps (m-1) to (m-5) and optional stacking step (m-6) are performed inline, i.e., on a single pouch making machine.

The present invention is further directed to a pouch obtainable by the method for producing pouches as described above.

The present invention further relates to a method for printing an unprinted electrophotographically printable fillable pouch as described above comprising the step of dry-toner based electrophotographic printing, at least one main surface of the pouch. The printing can be performed as format wide printing or partial printing, preferably as borderless or nearly borderless format wide printing. In case of an integrated zipper printing in this area should be avoided. As used herein, the term "format wide printing" refers to printing of the pouch wherein the full surface of one main surface of the pouch is printed. Borderless printing allows to generate a print image without any unprinted margins. The term "partial printing" refers to printing wherein only a part of the main surface, typically the major part, i.e., more than 50%, preferably more than 60% or more than 70% of one main surface of the pouch is printed. As meant herein, the printed surface is a rectangular area surrounding the print image and also including regions within the print image that do not receive toner.

In the electrophotographic printing process a latent image is recorded on a charged semiconductor (e.g. e semiconductor drum, the so called "imaging drum") by light of a specific wavelength, typically by light from a laser or from LEDs. This latent image is developed by contacting it to one or more dry toners. Finally, the toner image is contacted and transferred to the toner-receiving surface followed by heat and/or IR radiation and pressure fixing of the toner image in the fusing unit. The dry-toner based electrophotographic printing process is also known as "xerography", "xerographic printing" or "laser printing".

The method for printing may comprise the steps of (p-1) feeding the pouch from a stack of pouches into an electrophotographic printer, e.g. a laser printer or LED printer; preferably with the closed end of the pouch first, (p-2) transporting the pouch to the imaging unit comprising an imaging drum; (p-3) transfer printing of the toner image from the imaging drum to one main surface of the pouch, (p-4) transporting the pouch with the toner image on one main surface to the fuser unit, (p-5) fixing the toner image on one main surface of the pouch by heat and/or IR light and pressure in the fuser unit, and (p-6) restacking the pouches in a tray.

According to the present invention the method for printing an unprinted electrophotographically printable fillable pouch may be performed for one main surface of the pouch or for the first and the second main surface of the pouch. In the latter case, (p-2 to (p-5) and optional steps (p-1) and (p-6) performed for the first main surface, are repeated for the second main surface of the pouch. The method for printing may be performed in such a way that both main surfaces are printed either by turning of the pouch in the electrophotographic printer (single pass process) or by turning the whole stack of pouches as obtained in the tray after step (p-6) and refeeding the stack to the same printer according to step (p-1).

Exemplary electrophotographic printing systems are commercially available sheet fed printers from Oki, Hewlett Packard, Canon, Epson, KyoceraRicoh, Toshiba, Konica Minolta and Xeikon.

The electrophotographical printing may be full color CMYK printing, full color CMYK printing with additional colors, particularly white or transparent (clear). Preferably the electrophotographic printing is full color CMYK printing. Particularly, food compliant toners are applicable for the electrophotographically printable pouches like QA-I, ICE and Cheetah toners from Xeikon or Simitri® HD E Toner in AccurioPress digital printing systems from Konica Minolta.

Any dry electrophotographic toner can be used for printing the pouches. Suitable dry toners comprise meltable particles based e.g. on fusible polyester particles, dye pigments as well as additives to ensure proper image formation on the imaging drum as well as good performance in the transfer and fusing steps. Depending on the intended use of the pouches the toner is preferably safe for use on food packaging, i.e. it does not contain substances which migrate through the layers of the electrophotographically printable flexible film into a packaged good leading to non-compliant food. Other toners which do contain substances that can migrate through the layers can also be applied to the toner-receiving layer of the pouches if the electrophotographically printable pouches are not intended for food packaging.

The (micro)porous character and the high surface area of the toner-receiving layer (b) according to the invention allow the fused and plasticized toner particles to flow easily onto the toner-receiving layer (b) and to be firmly anchored on top of the toner-receiving layer (b) already at minimum fixing temperatures in relation to the respective toner system.

One example of printing system suitable in the method according to the present invention is an electrophotographically printer of the Pro 9 Series from Oki/Japan.

The printing method according to the present invention enables—besides partial printing—the continuous printing of all regions of the main surface of the pouch, preferably excluding thicker regions of the pouch like the edge of a folded bottom or the area in which a zipper is included.

The present invention further relates to a method for producing a printed pouch, comprising the steps of (1) producing an unprinted electrophotographically printable fillable pouch from an unprinted electrophotographically printable film according to the method as described above; and (2) printing the pouch according to the method as described above.

Moreover, the present invention is directed to a method for producing a filled printed pouch comprising the steps of (f-1) producing a printed pouch according to the method described above; (f-2) optionally integrating a spout or valve; (f-3) setting-up the printed pouch for filling with goods; (f-4) filling the pouch with goods; and (f-5) sealing the open side of the pouch to close the pouch. As used herein, the term "goods" refers to any product which is suitable for filling into a pouch, typically liquids and solids as described above. The sealing step (f-5) may be provided by means of heat sealing, ultrasonic sealing or a combination of both. Steps (f-2) to (f-5) may be performed in any meaningful sequence according to the requirements of the filling process. Depending on the type of goods to be filled into the pouch, the spout or valve can be integrated into the pouch (step (f-2)) before or after the filling step (f-4). If filling of the pouch through the spout or valve is practical, the sealing step (f-5) can also be performed before the filling step (f-4).

EXAMPLES

Examples 1 to 3

Preparation of Aqueous Coating Composition for the Toner-Receiving Layer (b)

6 kg of 25 wt. % of hydrochloric acid and 0.8 kg of boric acid were added to 500 l of water in a 2000 l vessel while stirring. Stirring was continued and 260 kg of boehmite (DISPERAL® HP14, available from Sasol) were added slowly to obtain a dispersion of boehmite particles. 8 kg of a gel type silica (Gasil® HP 270 available from PQ Corporation) having a specific pore volume of 1.8 ml/g and an oil absorption of 280 g/100 g were added to the boehmite dispersion.

In a separate step, the binder solution was prepared by adding 27 kg of poly(vinyl alcohol) having a degree of hydrolysis of from 86.7 to 88.7 mol % and a 4 wt. % aqueous solution viscosity of 38 to 42 m·Pas (Mowiol® 40-88, available from Kuraray) to 200 l of cold water in a 400 l heated vessel while stirring. The suspension was heated to about 90° C. for 1 hour while stirring with a blade agitator until the poly(vinyl alcohol) was dissolved.

The still hot binder solution was slowly poured into the boehmite dispersion under stirring. Cold water was added under stirring in order to adjust the total volume of the aqueous coating composition to 1000 l. It was stirred for further 30 minutes and temperature decreased to about 45° C. The solid content of the dispersion was about 30.2% by weight with a boehmite to poly(vinyl alcohol) weight ratio of about 9.6:1. The median particle sizes were determined as described before: boehmite $D_{v50}$=100 nm, gel-type silica $D_{v50}$=8.7 µm.

Example 1

Preparation of Electrophotographically Printable Film

The application of the aqueous coating composition to prepare toner-receiving layer (b) was conducted in a roll-to-roll process.

One surface of a 23 μm thick white BOPET film Sarafil® TW102 already coated with a thin polyacrylate coating on one surface was unwind in a coating machine and subjected to a corona treatment on the polyacrylate coated side. The warm aqueous coating composition was applied uniformly to the corona-treated surface of the film using a curtain coating head at a coating speed of 150 m/min to obtain a wet coating weight of about 73 g/m$^2$. Afterwards, the coating was dried in a drying oven at up to 100° C. to a dry coating weight of 22 g/m$^2$. The resulting microporous toner-receiving layer has a smooth, visually and haptically pleasant surface with a medium gloss and very low stickiness when touched.

In a second step the coated roll is corona treated and then laminated to a 7 μm aluminum foil on the side opposite to the toner-receiving layer by applying a standard solvent-free 2-component laminating adhesive comprising prepolymer and (poly)isocyanate (LOCTITE LIOFOL LA 7772/LA 6172, available from Henkel). This laminate was stored for 3 days in order to finish the crosslinking of the adhesive.

In a third step this laminate was laminated to a 55 μm blown polypropylene sealing film from Coveris (Germany) on the aluminum side using the same adhesive as described above.

The structure of the electrophotographically printable flexible film is as follows:

| layers | thickness/ coating weight |
|---|---|
| toner-receiving layer (b) | 22 g/m$^2$ |
| polyacrylate adhesion promoting layer (a3) | 0.1 g/m$^2$ |
| white BOPET film (a1i-1) | 23 μm (incl. polyacrylate) |
| laminating adhesive | 2 g/m$^2$ |
| aluminum foil (a4) | 7 μm |
| laminating adhesive | 2 g/m$^2$ |
| blown polypropylene coextruded sealing film (a2) (3-layer film comprising a PP homopolymer core layer and two PP copolymer skin layers) | 55 μm |

Preparation of Stand-Up Pouches

The electrophotographically printable flexible film was converted to rolls of 440 mm width for the pouch body and 80 mm width for the bottom and 2000 m length. The film reel for the folded pouch body was provided in a width of 440 mm: 200 mm+200 mm+2×20 mm. 2×20 mm extra were needed to print control marks which are cut off later in the pouch making process. The film reel for the bottom was provided separately in a width of 80 mm: 35 mm+35 mm+10 mm. 10 extra mm were needed to print control marks, which are cut off later in the pouch making process.

Stand-up pouches were manufactured from this material using a pouch making machine from Mamata Machinery Pvt. Ltd (type Mamanta Vegaplus 610) by unwinding the two rolls of the film and folding the film web so that the toner receiving layers were outside opposite to each other, dividing the folded web to obtain two separate webs, integrating the pouch bottom, integrating a thin zipper and sealing the polypropylene layers at the zipper, at the edges, and at the bottom, followed by stacking the pouches. The stand-up pouches have dimensions of 130 mm×200 mm and a filling volume of 250 ml with one open side with the zipper opposite to the bottom for the later filling with goods. Both main surfaces of the pouches are printable by an electrophotographic printing process.

Printing of the Pouches

A stack of 20 unprinted electrophotographically printable pouches were positioned in a friction feeder of a Pro 9 Series printer from Oki/Japan with 4 Colors (CMYK). Single pouches from the bottom of the pouch stack were fed intermittent to the electrophotographic print unit, where the toner image is transferred to the surface of the toner receiving layer followed by fusing the toner onto the toner receiving layer by heated rollers with a temperature setting of approximately 150 to 160° C. in the corresponding print mode. The pouches fed properly into the printer and were stacked after printing and fusing in the printed format stacking station without any jam in the printing process.

The printing process was repeated with the 20 pouches positioned in the feeder in the opposite direction (top-down direction) in order to print the second yet unprinted side.

Figure 3:
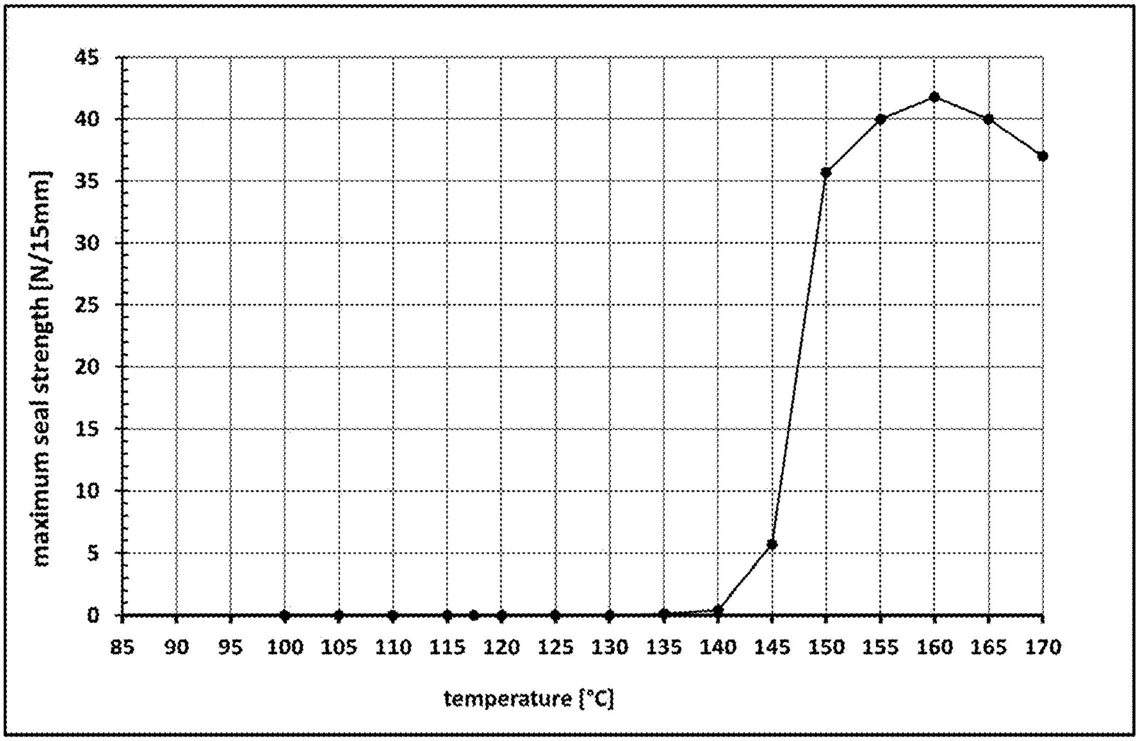
FIG. 3 is the sealing curve of the sealing layer of the multilayer film of Example 1.

The printed pouches are ready for filling with goods, optionally closing the open side by the integrated zipper line, sealing the one open side by a heat seal device between the edge and the zipper. The properties of the pouches are shown in Table 1. The sealing curve is shown in FIG. 3. The inflection point is marked by an arrow.

Example 2

Instead of 23 μm white BOPET base film as described in Example 1 a 90 μm white BOPP film coextruded with sealing layers and barrier layer based on EVOH (Polifilm Type 3007.TTT.558.w available from Polifilm Extrusion GmbH, Germany) is used for coating with the toner-receiving coating. The lamination steps with aluminum foil and sealing layer are omitted. The coated film is sealable due to the coextrusion coating on the non-toner receptive coating side.

The structure of the electrophotographic printable flexible film is as follows:

| layers | thickness/coating weight |
|---|---|
| toner-receiving layer (b) | 22 g/m$^2$ |
| Coextruded multilayer polymer film (a): | 90 μm |
| blown PP homopolymer layer (a3) | |
| white BOPP homopolymer layer (a1) | |
| tie layer (a3) | |
| EVOH barrier polymer layer (a4) | |
| tie layer (a3) | |
| white BOPP homopolymer layer (a1) | |
| PP copolymer layer (a2) | |

Figure 4:
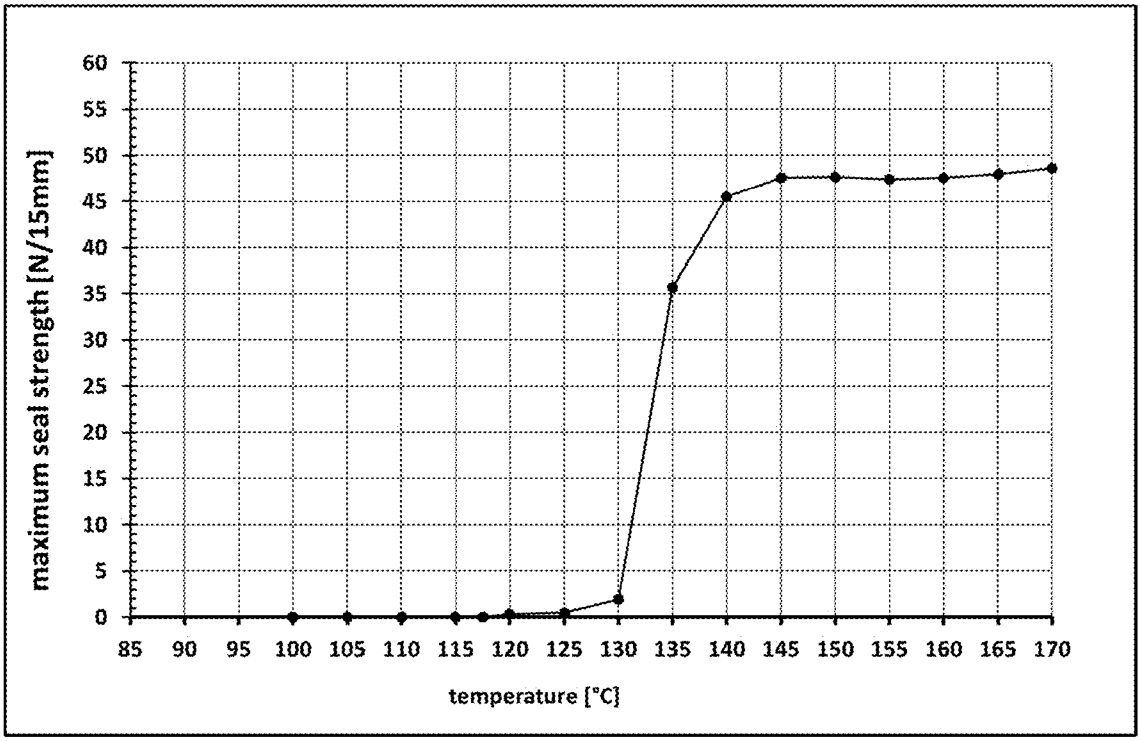
FIG. 4 is the sealing curve of the sealing layer of the multilayer film of Example 2.

Coating, pouch manufacturing and printing are performed as in Example 1. The properties of the pouches are shown in Table 1. The sealing curve is shown in FIG. 4. The inflection point is marked by an arrow.

Example 3

Figure 5:
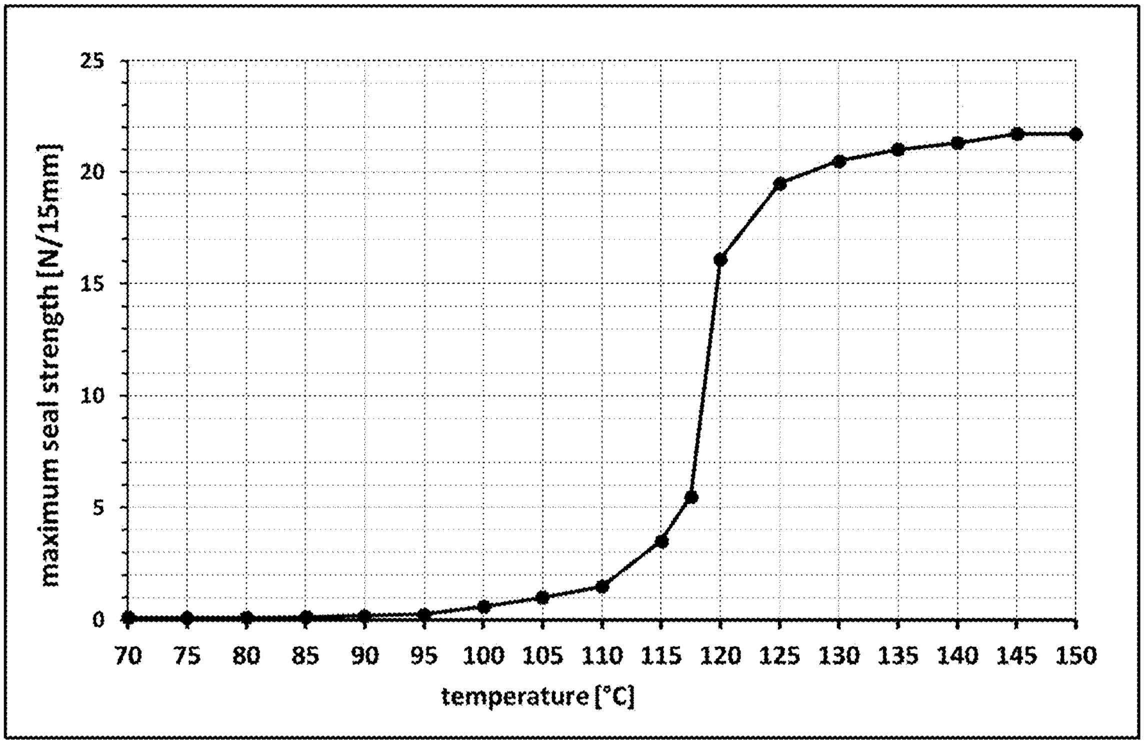
FIG. 5 is the sealing curve of the sealing layer of the multilayer film of Example 3.

Example 1 was repeated in all parameters except that sealing layer was a 60 μm thick LDPE film. The properties of the pouches are shown in Table 1. The sealing curve is shown in FIG. 5. The inflection point is marked by an arrow.

Comparative Example

Example 1 was repeated in all parameters except that the 8 kg gel type silica particles Gasil® HP 270 in the aqueous coating composition to prepare toner-receiving layer (b) was replaced with the same amount of the fine boehmite particles of DISPERAL® HP14. The properties of the pouches are shown in Table 1. The sealing curve is identical to the curve obtained in Example 1 (FIG. 3).

Applied Test Methods

The thickness of the unprinted electrophotographically printable film was determined according to EN ISO 534: 2011 in mm.

Rz, Ra, dynamic CoF, gloss, tear strength and heat sealing temperature of the unprinted electrophotographically printable film were determined as described before The sealing tests to obtain the sealing curve were performed on a laboratory sealer SGPE3000, available from Willi Kopp e.K. Verpackungssysteme, Reichenbach, Germany and the inflection point of the sealing curve is evaluated manually to obtain the correspondent temperature reading (=heat sealing temperature).

The print performance was rated visually: It was judged for color gamut, color saturation, print sharpness and resolution as well as for artefacts like dropouts, streakiness and gloss differences. A rating of 1 to 5 is correlated to the quality of the print: 1=print with very visible artefacts and/or low color gamut, color saturation, print sharpness and resolution to 5=no print artefacts and high color gamut, color saturation, print sharpness and resolution.

Pre-sealing after printing is evaluated by opening the printed pouch manually. The results were rated as follows: 1=opening of pouch is not possible, 3=opening possible with some force due to slight sealing and 5=opening without any pre-sealing issues.

The adhesion test was performed according to Finat Test Methods No. 21 (FTM 21) in a standard climate (23° C. and 50% r.h.).

The adhesion of printed areas is evaluated with an adhesive tape Tesa film 4101 from Tesa SE, Germany. The results were rated as follows:

1 toner comes off completely, adhesion issue of the toner to the substrate
2 toner comes off to a large extent, more than 50%
3 toner comes off partially, less than 50%
4 only slight transfer of the toner to the tape
5 no significant transfer of toner to the tape Flatness of the printed pouches is rated after electrophotographically printing and cooling to room temperature visually. A rating of 1 to 5 is correlated to the flatness from 1=strong curling with edges coming up more than 5 cm or extreme waviness to 5=perfectly flat.

Haptic performance was evaluated by a test person feeling the surface of the pouches. A non-sticky surface is desired for customer satisfaction as well as good machinability. Sticky surfaces often cause problems when feeding the pouches into a machine, such as a printing press.

TABLE 1

| | Example 1 | Example 2 | Example 3 | Comparative Example |
|---|---|---|---|---|
| Thickness of multilayer polymer film (a) in µm | 94 | 90 | 99 | 95 |
| Thickness of unprinted printable film in µm | 116 | 112 | 121 | 117 |
| Rz | 5.47 | 5.30 | 5.2 | 2.44 |
| Ra | 0.763 | 0.771 | 0.74 | 0.248 |
| Dynamic CoF film to film | 0.38 | 0.39 | 0.36 | 0.67 |
| Gloss 60° | 15 | 15 | 15 | 51 |
| Tear resistance in N | | | | |
| MD | 3.0 | 1.8 | 2.5 | 3.1 |
| CD | 6.4 | 8.8 | 5.3 | 6.2 |
| Heat sealing temperature in ° C. | 148 | 132.5 | 118.5 | 147 |
| Pouch manufacturing | Good | Good | Good | Transporting issues and folds; several machine stops |
| Feeding to electrophotographic printer | Good | Good | Good | Singulation issues from stack of pouches (simultaneous feeding of 2 or more pouches) |
| Print performance | 5 | 5 | 5 | N/A |
| Toner adhesion | 5 | 5 | 5 | 4 |
| Pre-sealing after printing | 5 | 5 | 3 | 5 |
| Flatness | 5 | 4 | 5 | 5 |
| Haptic | Non-sticky | Non-sticky | Non-sticky | Sticky |

It is evident form the experimental data that the inventive electrophotographically printable pouches formed from an unprinted electrophotographically printable film comprising the specific combination of fine inorganic particles and coarse particles combine excellent machinability on pouch making and printing machines with high-quality printability with dry toner, and desired haptic properties. With the laser printer used in the present experiments, the pouch of Example 3 shows the problem of slight pre-sealing after printing due to the relatively low heat sealing temperature of the sealing layer.

Aspects of the Invention

1. An unprinted electrophotographically printable fillable pouch made of an unprinted electrophotographically printable film comprising:
   (a) a multilayer polymer film comprising a base layer (a1) and a sealing layer (a2) which is the inner layer of the pouch and (b) at least one toner-receiving layer as the outer layer deposited on the multilayer polymer film (a) from an aqueous coating composition comprising:
(b1) a polymeric binder,
(b2) fine inorganic particles having a median particle size ($D_{v50}$) of from 50 to 300 nm, preferably from 65 to 200 nm, and more preferably from 80 nm to 180 nm, as determined by laser diffraction according to ISO 13320:2020-01, and
(b3) coarse inorganic and/or organic particles having a median particle size ($D_{v50}$) of from 3 to 14 μm, preferably from 5 to 13 μm, more preferably from 6 to 13, and most preferably from 7 to 12 μm, as determined by laser diffraction according to ISO 13320:2020-01;

wherein the unprinted electrophotographically printable film has an average surface roughness Rz of from 3.0 to 12.0 μm, preferably from 4.0 to 10.0 μm, as determined on the surface of the toner-receiving layer (b) according to DIN EN ISO 4287:2010-07 with a sampling length ln of 4.0 mm and a single sampling length Ir of 0.8 mm as defined in DIN EN ISO 4288:1998-04 with a 2 μm probe tip and an aperiodic profile setting.

2. An unprinted electrophotographically printable fillable pouch made of an unprinted electrophotographically printable film comprising:
(a) a multilayer polymer film comprising a base layer (a1) and a sealing layer (a2) which is the inner layer of the pouch and
(b) at least one toner-receiving layer as the outer layer deposited on the multilayer polymer film (a) from an aqueous coating composition comprising:
(b1) a polymeric binder,
(b2) fine inorganic particles having a median particle size (Dv50) of from 50 to 300 nm, preferably from 65 to 200 nm, more preferably from 80 nm to 180 nm, as determined by laser diffraction according to ISO 13320:2020-01, and
(b3) coarse inorganic and/or organic particles having a median particle size (Dv50) of from 3 to 14 μm, preferably from 5 to 13 μm, more preferably from 6 to 13, and most preferably from 7 to 12 μm, as determined by laser diffraction according to ISO 13320:2020-01;

wherein the coarse inorganic and/or organic particles have a specific pore volume of from 1.3 to 2.5 ml/g, preferably from 1.5 to 2.3 ml/g, more preferably from 1.7 to 2.1 ml/g, as determined according to DIN 66134:1998-02.

3. An unprinted electrophotographically printable fillable pouch made of an unprinted electrophotographically printable film comprising:
(a) a multilayer polymer film comprising a base layer (a1) and a sealing layer (a2) which is the inner layer of the pouch and
(b) at least one toner-receiving layer as the outer layer deposited on the multilayer polymer film (a) from an aqueous coating composition comprising
(b1) a polymeric binder,
(b2) fine inorganic particles having a median particle size (Dv50) of from 50 to 300 nm, preferably from 65 to 200 nm, more preferably from 80 nm to 180 nm, as determined by laser diffraction according to ISO 13320:2020-01, and
(b3) coarse inorganic and/or organic particles having a median particle size (Dv50) of from 3 to 14 μm, preferably from 5 to 13 μm, more preferably from 6 to 13, and most preferably from 7 to 12 μm, as determined by laser diffraction according to ISO 13320:2020-01;

wherein the coarse inorganic and/or organic particles have an oil absorption value of from 220 to 400 g/100 g, preferably from 230 to 380 g/100 g, more preferably from 240 to 360 g/100 g, as determined according to DIN EN ISO 787-5:1995-10.

4. The pouch according to aspects 1 or 2, wherein the coarse inorganic and/or organic particles have an oil absorption value of from 220 to 400 g/100 g, preferably from 230 to 380 g/100 g, more preferably from 240 to 360 g/100 g.
5. The pouch according to aspects 1 or 3, wherein the coarse inorganic and/or organic particles have a specific pore volume of from 1.3 to 2.5 ml/g, preferably from 1.5 to 2.3 ml/g, more preferably from 1.7 to 2.1 ml/g.
6. The pouch according to aspects 2 or 3, wherein the unprinted electrophotographically printable film has an average surface roughness Rz of from 3.0 to 12.0 μm, preferably from 4.0 to 10.0 μm.
7. The pouch according to aspect 1, wherein the coarse inorganic and/or organic particles have a specific pore volume of from 1.3 to 2.5 ml/g, preferably from 1.5 to 2.3 ml/g, more preferably from 1.7 to 2.1 ml/g and an oil absorption value of from 220 to 400 g/100 g, preferably from 230 to 380 g/100 g, more preferably from 240 to 360 g/100 g.
8. The pouch according to any of the preceding aspects, wherein the sealing layer (a2) has a heat sealing temperature in the range of from 120 to 220° C., preferably from 130 to 200° C., more preferably in the range of from 140 to 190° C., and most preferably from 150 to 180° C., as determined according to the method disclosed in the description.
9. The pouch according to any of the preceding aspects, wherein the multilayer polymer film (a) is a coextruded polymer film or a laminated polymer film, preferably the multilayer polymer film (a) is a laminated polymer film.
10. The pouch according to any of the preceding aspects, wherein the base layer (a1) is a non-sealable polymer layer (a1i).
11. The pouch according to aspect 10, wherein the non-sealable polymer layer (a1i) is a biaxially oriented polymer film (a1i-1).
12. The pouch according to aspect 11, wherein the biaxially oriented polymer film (a1i-1) comprises a thermoplastic material preferably selected from polyesters, polyolefins, polystyrenes, polyamides, and blends and copolymers thereof, and more preferably selected from poly(ethylene terephthalate)s, poly(ethylene naphthalate)s, polylactides, polypropylenes, polyamides and blends and copolymers thereof.
13. The pouch according to aspect 12 wherein the biaxially oriented polymer film (a1i-1) is a biaxially oriented polypropylene (BOPP) film or a biaxially oriented poly(ethylene terephthalate) (BOPET) film.
14. The pouch according to aspect 10, wherein the non-sealable polymer layer (a1i) is a non-oriented polymer layer (a1i-2).
15. The pouch according to aspect 14, wherein the non-oriented polymer layer (a1i-2) comprises regenerated cellulose or a cellulose acetate, such as cellulose monoacetate, diacetate or triacetate or any combination thereof.

16. The pouch according to any of the preceding aspects, wherein the base layer (a1) has a thickness of from 8 to 80 μm, preferably from 12 to 60 μm.
17. The pouch according to any of the preceding aspects, wherein the sealing layer (a2) is a heat-sealing layer, and/or a layer for ultrasonic sealing, preferably it is a heat-sealing layer.
18. The pouch according to any of the preceding aspects, wherein the sealing layer (a2) is a heat-sealing layer and comprises a not biaxially oriented polyamide (PA); a polyethylene, such as high density polyethylene (HDPE), low density polyethylene (LDPE), linear low density polyethylene (LLDPE), ultra linear low density polyethylene (ULLDPE), or metallocene based LLDPE (mLLDPE); a polyethylene copolymer, such as ethylene (meth)acrylic acid copolymer (EAA), ethylene methyl acrylate (EMA), ethylene-vinyl acetate copolymer (EVA), ethylene butyl acrylate (EBA); a polypropylene, such as cast polypropylene (cPP); a blown polypropylene (blown PP); a polypropylene copolymer, such as a propylene/ethylene copolymer (including terpolymers); (co)polyesters, such as amorphous poly(ethylene terephthalate) (APET), not biaxially oriented glycol-modified poly(ethylene terephthalate) (PET-G), or not biaxially oriented polylactides (PLA), e.g. cast polylactide (cPLA); poly(vinylidene chloride); poly(vinylchloride); poly(vinyl acetate); a poly(meth) acrylate or any combination thereof.
19. The pouch according to any of the preceding aspects, wherein the sealing layer (a2) is a coextruded multilayer polymer film, preferably comprising polypropylene homopolymer and polypropylene copolymer, such as a cast or blown coextruded multilayer polymer film comprising polypropylene homopolymer and polypropylene copolymer.

The pouch according to any of the preceding aspects, wherein the multilayer polymer film (a) is a laminated polymer film and the sealing layer (a2) has a thickness of from 25 to 120 μm, preferably from 30 to 90 μm.

21. The pouch according to any of aspects 1 to 19, wherein the multilayer polymer film (a) is a coextruded polymer film and the sealing layer (a2) has a thickness of from 8 to 25 μm.
22. The pouch according to any of the preceding aspects, wherein the base layer (a1) and the sealing layer (a2) are a monomaterial, such as a polypropylene or poly (ethylene terephthalate) monomaterial, e.g.
    - the base layer (a1) is a BOPP film and the sealing layer (a2) is a cast or blown PP film or
    - the base layer (a1) is a BOPP film and the sealing layer (a2) is a blown coextruded multilayer film comprising polypropylene homopolymer and polypropylene copolymer or
    - the base layer (a1) is a BOPET film and the sealing layer (a2) is an APET or PET-G film.
23. The pouch according to any of the preceding aspects, wherein the multilayer polymer film (a) further comprises at least one intermediate layer (a3), preferably an adhesion promoting layer or a tie layer.
24. The pouch according to aspect 23, wherein the adhesion promoting layer comprises a polymer selected from poly(meth)acrylates, copolymers comprising units derived from (meth)acrylates, poly(vinyl acetate) s, polyurethanes, polypropylene copolymers, such as polypropylene terpolymers, and blends of these polymers.

The pouch according to aspects 23 or 24, wherein the intermediate layer (a3) is located on top or below or on both sides of the base layer (a1).

26. The pouch according to any of the preceding aspects, wherein the multilayer polymer film (a) comprises a barrier layer (a4).
27. The pouch according to aspect 26, wherein the barrier layer (a4) is located between the base layer (a1) and the sealing layer (a2).
28. The pouch according to aspects 26 or 27, wherein the barrier layer (a4) is a metal or metal oxide, a metal or metal oxide coated polymeric carrier film, a metal foil or a polymer film having barrier properties, preferably the barrier layer (a4) is a polymer film comprising an ethylene/vinyl alcohol copolymer (EVOH) or a polyamide (co)polymer; an aluminum foil or a copper foil, preferably an aluminum foil.
29. The pouch according to any of aspects 26 to 28, wherein the barrier layer (a4) has a thickness of from 6 to 30 μm, preferably from 7 to 25 μm, and in case it is an aluminum foil, more preferably from 7 to 15 prn.
30. The pouch according to any of the preceding aspects, wherein the base layer (a1) consists of coextruded sublayers comprising two core layers (all) and a central barrier layer (a4), and optionally intervening tie layers (a3).
31. The pouch according to aspect 30, wherein the multilayer polymer film (a) is a coextruded film, such as a blown film, preferably comprising the following layers:
    - adhesion promoting layer (a3) such as a polypropylene homopolymer
    - core layer (a11) such as a BOPP core layer,
    - optionally a tie layer (a3),
    - a barrier layer (a4) such as an EVOH layer,
    - optionally a tie layer (a3),
    - core layer (a11) such as a BOPP core layer,
    - sealing layer (a2) such as a polypropylene copolymer, e.g. a polypropylene terpolymer.
32. The pouch according to any of the preceding aspects, wherein the multilayer polymer film (a) has a thickness of from 60 to 300 μm, preferably from 75 to 250 μm, more preferably from 80 to 200 μm, and most preferably from 85 to 130 μm.
33. The pouch according to any of the preceding aspects, wherein the polymeric binder (b1) comprises a water-soluble polymeric binder, preferably one or more water-soluble polymeric binders are the sole polymeric binder (b1).
34. The pouch according to any of the preceding aspects, wherein the polymeric binder (b1) comprises poly (vinyl alcohol); poly(vinyl alcohol) derivatives; poly (ethylene oxide); poly (vinyl methyl ether); cellulose derivatives, such as methylcellulose, ethylcellulose, and carboxymethylcellulose; polyvinylpyrrolidone; or any combination thereof; preferably poly(vinyl alcohol), poly(vinyl alcohol) derivatives, or any combination thereof.
35. The pouch according to aspect 34, wherein poly(vinyl alcohol) or a derivative thereof is used as the sole polymeric binder (b1) in the toner-receiving layer (b).
36. The pouch according to aspects 34 or 35, wherein the poly(vinyl alcohol) has a degree of hydrolysis of from 80 to 99 mol %, preferably from 86 to 98 mol %.
37. The pouch according to any of aspects 34 to 36, wherein the poly(vinyl alcohol) has a weight average molecular weight of at least 100.000 g/mol, preferably at least 120.000 g/mol, and more preferably at least 150.000 g/mol, as determined by gel permeation chromatography using polystyrene standards combined with static light scattering (absolute method) on re-acetylized specimen.

38. The pouch according to any of the preceding aspects, wherein the aqueous coating composition further comprises a crosslinking agent (b4), preferably selected from boric acid; borates; dialdehydes, such as glyoxal, glyoxylic acid, salts of glyoxylic acid, such as sodium or calcium salts; dihydrazides, such as adipic acid dihydrazide; di- or polyols, such as methylolmelamine; urea glyoxyl resin or urea glyoxal resins; compounds having silanol groups; and any combination thereof.

39. The pouch according to aspect 38, wherein the polymeric binder (b1) is poly(vinyl alcohol) or a derivative thereof and the crosslinking agent (b4) comprises boric acid and/or a borate.

40. The pouch according to aspects 38 or 39, wherein the toner-receiving layer (b) comprises boron in an amount of >0 and less than 60 $mg/m^2$, preferably less than 40 $mg/m^2$, more preferably less than 30 $mg/m^2$, and most preferably less than 20 $mg/m^2$.

41. The pouch according to any of the preceding aspects, wherein the fine inorganic particles (b2) are selected from alumina, such as fumed alumina; aluminum oxide hydroxide, such as boehmite and pseudoboehmite; aluminum hydroxide; cationically surface-modified silica, such as cationically surface-modified fumed silica and cationically surface-modified colloidal silica obtained by a wet chemical process; and any combination thereof, preferably from boehmite, cationically surface-modified fumed silica, fumed alumina, and combinations thereof, more preferably from boehmite and cationically surface-modified fumed silica and combinations thereof, and most preferably the fine inorganic particles (b2) are boehmite.

42. The pouch according to aspect 41, wherein
   (i) the fine inorganic particles (b2) are boehmite particles having a BET specific surface area of from 100 to 200 $m^2/g$, preferably from 120 to 180 $m^2/g$, determined by gas adsorption according to ISO 9277:2010 on the powder after calcination at 550° C. for 3 h;
   (ii) the fine inorganic particles (b2) are cationically surface-modified fumed silica particles having a BET specific surface area of from 100 to 400 $m^2/g$, preferably from 200 to 300 $m^2/g$, determined by gas adsorption according to ISO 9277:2010 before cationization; and/or
   (iii) the fine inorganic particles (b2) are fumed alumina particles having a BET specific surface area of from 50 to 150 $m^2/g$, preferably from 85 to 115 $m^2/g$, determined by gas adsorption according to ISO 9277:2010.

43. The pouch according to aspects 41 or 42, wherein
   (i) the fine inorganic particles (b2) are boehmite particles and the weight ratio of boehmite particles to binder (b1) is within the range of from 7:1 to 25:1, preferably from 7.5:1 to 20:1, and more preferably from 8:1 to 12:1;
   (ii) the fine inorganic particles (b2) are cationically surface-modified silica particles and the weight ratio of silica particles to binder (b1) is within the range of from 3:1 to 15:1; and/or
   (iii) the fine inorganic particles (b2) are alumina particles and the weight ratio of alumina particles to binder (b1) is within the range of from 10:1 to 20:1.

44. The pouch according to any of aspects 41 to 43, wherein the fine inorganic particles (b2) are boehmite particles and the toner-receiving layer (b) has a porosity of from 0.3 to 1.5 ml/g, preferably from 0.35 to 1.2 ml/g, more preferably from 0.4 to 1.0 ml/g, most preferably from 0.5 to 0.8 ml/g, the fine inorganic particles (b2) are cationically surface-modified silica particles and the toner-receiving layer (b) has a porosity of from 0.5 to 2.0 ml/g; and/or the fine inorganic particles (b2) are alumina particles and the toner-receiving layer (b) has a porosity of from 0.2 to 1.2 ml/g.

45. The pouch according to any of aspects 41 to 44, wherein, when the fine inorganic particles (b2) are boehmite particles, the aqueous coating composition further comprises an acidic dispersing agent (b5), preferably an organic and/or inorganic acid having a pka value of less than 5.0; more preferably an inorganic acid having a pka value of less than 2.0, such as hydrochloric acid.

46. The pouch according to aspect 45, wherein the acidic dispersing agent (b5) is used in an amount of from more than 0 to 10 wt. %, preferably from 1 to 5 wt. %, each based on the amount of the fine inorganic particles (b2).

47. The pouch according to any of the preceding aspects, wherein the coarse particles (b3) are selected from
   inorganic particles selected from aluminum oxide; aluminum oxide hydroxide, such as boehmite or pseudoboehmite; silica, such as precipitated silica and gel type silica; and any combinations thereof;
   organic particles selected from polymeric particles, such as dispersible particles comprising a polymer selected from polymers and copolymers of ethylene, propylene, styrene, tetrafluoroethylene, and (meth) acrylates, such as poly(methylmethacrylate) and styrene/methylmethacrylate copolymer, polyamides, polyesters, polymethyl ureas, and starch, such as rice or corn starch, and combinations thereof, and
   combinations of any of these inorganic and organic particles.

48. The pouch according to aspect 47, wherein the coarse particles (b3) are inorganic particles, preferably gel-type silica particles.

49. The pouch according to any of the preceding aspects, wherein the coarse particles (b3) are spherical particles.

50. The pouch according to any of the preceding aspects, wherein the fine inorganic particles (b2) are boehmite particles and the coarse particles (b2) are gel-type silica particles.

51. The pouch according to any of the preceding aspects, wherein the toner-receiving layer (b) comprises the coarse particles (b3) in a maximum amount of 20 wt. %, preferably in an amount of from 2 to 5 wt. %, based on the total dry weight of the toner receiving layer.

52. The pouch according to any of the preceding aspects, wherein the multilayer polymer film (a) and the toner-receiving layer (b) are in direct contact with each other.

53. The pouch according to any of the preceding aspects, wherein the toner receiving layer (b) is coated over the multilayer polymer film (a) at a dry coating weight being in the range of from 6 to 27 $g/m^2$, preferably from 10 to 25 $g/m^2$, and more preferably from 15 to 24 $g/m^2$.

54. The pouch according to any of the preceding aspects, wherein the unprinted electrophotographically printable film has an arithmetic average roughness Ra of from 0.5 to 2.0 μm.

55. The pouch according to any of the preceding aspects, wherein the unprinted electrophotographically printable film exhibits a dynamic coefficient of friction of the surface of toner-receiving layer (b) to itself (CoF film to film) in the range of from 0.30 to determined according to DIN EN ISO 8295:2004-10 but with 1 kg weight at 300 mm/min drawing speed.
56. The pouch according to any of the preceding aspects, wherein the toner-receiving layer (b) is a non-transparent layer.
57. The pouch according to aspect 56, wherein when the multilayer polymer film (a) is a transparent film having a haze value of no more than 5%, the unprinted electrophotographically printable film has a haze value of higher than 25%, more preferably at least 30%, and most preferably at least 40%, as determined according to ASTM D1003, Procedure A.
58. The pouch according to any of the preceding aspects, wherein the unprinted electrophotographically printable film has a gloss of from 10 to 30 gloss units, as determined on the surface of toner-receiving layer (b) at 60° according to ISO 2813:2014.
59. The pouch according to any of the preceding aspects, wherein the unprinted electrophotographically printable film has a tear resistance of at least 1 N in machine direction (MD) and cross direction (CD), preferably at least 1.5 N in MD and at least 2.0 N, more preferably at least 4.0 N in CD, as determined according to ISO 6383-1:2015-12.
60. The pouch according to any of the preceding aspects, wherein the pouch has two printable main surfaces.
61. The pouch according to any of the preceding aspects, wherein the pouch is closeable, preferably sealable such as by means of heat and/or ultrasound.
62. The pouch according to any of the preceding aspects having an inwardly folded bottom or an inserted bottom made of the unprinted electrophotographically printable film or a different polymeric film.
63. The pouch according to aspect 62, wherein the pouch when folded flat has a maximum of four film layers in the bottom area.
64. The pouch according to any of the preceding aspects, wherein the maximum thickness of the pouch when folded flat is in the range of from 200 to 600 μm, preferably from 200 to 500 μm.
65. The pouch according to any of the preceding aspects, wherein the pouch is a flexible pouch, preferably selected from the group consisting of a stand-up pouch, a flat bottom bag, flat bottom gusset bag, and a flat bottom side gusset bag.
66. The pouch according to aspect 65, wherein the pouch is a stand-up pouch such as a round seal stand-up pouch (Doyen type pouch) or a K-seal stand-up pouch.
67. The pouch according to any of the preceding aspects, wherein the pouch comprises one or more further features selected from a window, reclosable means such as a zipper (including a slider closure with end clip (zip lock) and a press-to-close zipper), a hook-and-loop fastener (velcro closure), and a cold-sealable adhesive strip; a Euro hole; a tear notch; perforations; a thin valve; and an opening for spouts or valves.
68. The pouch according to aspect 67, wherein the pouch comprises reclosable means or a thin valve and the overall thickness of the pouch including the reclosable means or the thin valve is in the range of from 500 to 1500 μm.
69. The pouch according to any of the preceding aspects, having a filling volume of 100 ml to 3 l.
70. The pouch according to any of the preceding aspects, wherein the pouch is suitable to package of liquids or solids, such as food, pet food, beverages, pharmaceuticals, personal care products, electronic parts, toys, lubricating oil, or gifts, preferably food, pet food, beverages, pharmaceuticals and/or personal care products.
71. A method for producing unprinted electrophotographically printable fillable pouches according to any of aspects 1 to 70 from the unprinted electrophotographically printable film on a pouch making machine, comprising the steps of:
    - (m-1) providing one or more webs of the unprinted electrophotographically printable film which are preferably unwound from one or more reels;
    - (m-2) moving the web(s) of the unprinted electrophotographically printable film in a longitudinal direction;
    - (m-3) converting the web(s) of unprinted electrophotographically printable film into a pouch precursor web having a desired shape by folding and/or stacking the web(s) with the toner-receiving layer (b) as outer layers of the pouch precursor web and optionally integrating a bottom;
    - (m-4) sealing the pouch precursor web, preferably by means of heat and/or ultrasound, to obtain a web of pouches;
    - (m-5) cutting off the pouches from the web; and
    - (m-6) optionally stacking the pouches.
72. The method according to aspect 71, wherein one or more of steps (m-3) to (m-5) further comprises integrating one or more of the features described in aspect 66 into a single pouch shape of the pouch precursor web.
73. The method according to aspects 71 or 72, wherein the bottom is made from the unprinted electrophotographically printable film provided as one of at least two webs of the unprinted electrophotographically printable film.
74. The method according to aspects 71 or 72, wherein the bottom is made from a different polymeric material which is provided as a web of the different polymeric material, preferably unwound from a further reel.
75. The method according to any of aspects 71 to 73, wherein the pouches are stand-up pouches, the converting step (m-3) comprises folding the web into a flat double web form and folding in a gusset for the bottom, the sealing step (m-4) comprises sealing the folded web in several sealing steps to create side seals in a vertical orientation relative to the longitudinal direction of the web as well as bottom seals, and the cutting step (m-5) comprises cutting off the pouches vertically along a central line through the common side seal area of two adjacent pouches and optionally cutting off excess material at the edges of the web.
76. A pouch obtainable by the method according to any of aspects 71 to 75.
77. A method for printing an unprinted electrophotographically printable fillable pouch according to any of aspects 1 to 70 or 76 comprising the step of dry-toner based electrophotographic printing at least one main surface of the pouch.
78. The method according to aspect 77 comprising format wide or partial electrophotographic printing at least one main surface of the pouch, preferably format wide electrophotographic printing.

79. The method according to aspects 77 or 78, comprising the steps of:
(p-1) feeding the pouch from a stack of pouches into an electrophotographic printer, e.g. a laser printer or LED printer; preferably with the closed end of the pouch first,
(p-2) transporting the pouch to the imaging unit comprising an imaging drum;
(p-3) transfer printing of the toner image from the imaging drum to one main surface of the pouch,
(p-4) transporting the pouch with the toner image on one main surface to the fuser unit,
(p-5) fixing the toner image on one main surface of the pouch by heat and/or IR light and pressure in the fuser unit, and
(p-6) restacking the pouches in a tray.
80. The method according to 79, wherein at least steps (p-2) to (p-5) are repeated for the second main surface of the pouch.
81. A method for producing a printed pouch, comprising the steps of
(1) producing an unprinted electrophotographically printable fillable pouch from an unprinted electrophotographically printable film according to the method of any of aspects 71 to 75 and
(2) printing the pouch according to the method of any of aspects 77 to 80.
82. A method for producing a filled printed pouch comprising the steps of:
(f-1) producing a printed pouch according to the method of aspect 81,
(f-2) optionally integrating a spout or valve;
(f-3) setting-up the printed pouch for filling with goods;
(f-4) filling the printed pouch with goods; and
(f-5) sealing the open side of the printed pouch to close the pouch.
83. The method according to aspect 82, wherein the sealing step (f-5) is provided by means of heat, and/or ultrasound.

The invention claimed is:

1. An unprinted electrophotographically printable fillable pouch made of an unprinted electrophotographically printable film comprising:
(a) a multilayer polymer film comprising a base layer (a1) and a sealing layer (a2), which is the inner layer of the pouch and
(b) at least one toner-receiving layer as the outer layer deposited on the multilayer polymer film (a) from an aqueous coating composition comprising:
(b1) a polymeric binder,
(b2) fine inorganic particles having a median particle size (Dv50) of from 50 to 300 nm, as determined by laser diffraction according to ISO 13320:2020-01, and
(b3) coarse inorganic and/or organic particles having a median particle size (Dv50) of from 3 to 14 μm, as determined by laser diffraction according to ISO 13320: 2020-01;
wherein the unprinted electrophotographically printable film has an average surface roughness Rz of from 3.0 to 12.0 μm, as determined on the surface of the toner-receiving layer (b) according to DIN EN ISO 4287: 2010-07 with a sampling length ln of 4.0 mm and a single sampling length Ir of 0.8 mm as defined in DIN EN ISO 4288:1998-04 with a 2 μm probe tip and an aperiodic profile setting.

2. An unprinted electrophotographically printable fillable pouch made of an unprinted electrophotographically printable film comprising
(a) a multilayer polymer film comprising a base layer (a1) and a sealing layer (a2), which is the inner layer of the pouch and
(b) at least one toner-receiving layer as the outer layer deposited on the multilayer polymer film (a) from an aqueous coating composition comprising
(b1) a polymeric binder,
(b2) fine inorganic particles having a median particle size (Dv50) of from 50 to 300 nm, as determined by laser diffraction according to ISO 13320:2020-01, and
(b3) coarse inorganic and/or organic particles having a median particle size (Dv50) of from 3 to 14 μm, as determined by laser diffraction according to ISO 13320:2020-01;
wherein the coarse inorganic and/or organic particles have a specific pore volume of from 1.3 to 2.5 ml/g, determined according to DIN 66134:1998-02, and/or an oil absorption value of from 220 to 400 g/100 g, as determined according to DIN EN ISO 787-5:1995-10.

3. The pouch according to claim 1, wherein the sealing layer (a2) has a heat sealing temperature in the range of from 120 to 220° C., as determined according to the method disclosed in the description.

4. The pouch according to claim 1, wherein the base layer (a1) is a non-sealable polymer layer (a1i).

5. The pouch according to claim 1, wherein the base layer (a1) and the sealing layer (a2) are a monomaterial.

6. The pouch according to claim 1, wherein the multilayer polymer film (a) further comprises at least one intermediate layer (a3), and/or a barrier layer (a4).

7. The pouch according to claim 1, wherein the multilayer polymer film (a) has a thickness of from 35 to 300 μm.

8. The pouch according to claim 1, wherein the polymeric binder (b1) comprises a water-soluble polymeric binder.

9. The pouch according to claim 1, wherein the fine inorganic particles (b2) are selected from alumina; aluminum oxide hydroxide; aluminum hydroxide; cationically surface-modified silica; and any combinations thereof.

10. The pouch according to claim 1, wherein the coarse particles (b3) are selected from
inorganic particles selected from aluminum oxide; aluminum oxide hydroxide; and any combinations thereof;
organic particles selected from polymeric particles; and
combinations of any of these inorganic and organic particles.

11. The pouch according to claim 1, wherein the coarse particles (b3) are spherical particles and/or wherein the coarse particles (b3) are comprised in the toner-receiving layer (b) in a maximum amount of 20 wt. %; based on the total dry weight of the toner-receiving layer.

12. The pouch according to claim 1, wherein the toner-receiving layer (b) is coated over the multilayer polymer film (a) at a dry coating weight in the range of from 6 to 27 $g/m^2$.

13. The pouch according to claim 1, wherein the unprinted electrophotographically printable film exhibits a dynamic coefficient of friction of the surface of toner-receiving layer (b) to itself (CoF film to film) in the range of from 0.30 to 0.50, determined according to DIN EN ISO 8295:2004-10 but with 1 kg weight at 300 mm/min drawing speed and/or the unprinted electrophotographically printable film has a gloss of from 10 to 30 gloss units, as determined on the surface of toner-receiving layer (b) at 60° according to ISO 2813:2014, and/or the unprinted electrophotographically printable film has a tear resistance of at least 1 N in machine direction (MD) and cross direction (CD), preferably at least 1.5 N in MD and at least 2.0 N, as determined according to ISO 6383-1:2015-12, and/or wherein when the multilayer polymer film (a) is a transparent film having a haze value of no more than 5%, the unprinted electrophotographically printable film has a haze value of higher than 25%, as determined according to ASTM D1003, Procedure A.

14. The pouch according to claim 1, wherein the pouch is a flexible pouch.

15. A method for producing unprinted electrophotographically printable fillable pouches according to claim 1 from the unprinted electrophotographically printable film on a pouch making machine, comprising the steps of:

(m-1) providing one or more webs of the unprinted electrophotographically printable film which are preferably unwound from one or more reels;

(m-2) moving the web(s) of the unprinted electrophotographically printable film in a longitudinal direction;

(m-3) converting the web(s) of unprinted electrophotographically printable film into a pouch precursor web having a desired shape by folding and/or stacking the web(s) with the toner-receiving layer (b) as outer layers of the pouch precursor web;

(m-4) sealing the pouch precursor web to obtain a web of pouches;

(m-5) cutting off the pouches from the web; and (m-6) optionally stacking the pouches, wherein one or more of steps (m-3) to (m-5) further optionally comprises integrating one or more features selected from a window, reclosable means; a Euro hole; a tear notch; perforations; a thin valve; and an opening for spouts or valves into a single pouch shape of the pouch precursor web.

16. A method for printing an unprinted electrophotographically printable fillable pouch according to claim 1 comprising the step of dry-toner based electrophotographic printing at least one main surface of the pouch.

17. A method for producing unprinted electrophotographically printable fillable pouches according to claim 2 from the unprinted electrophotographically printable film on a pouch making machine, comprising the steps of:

(m-1) providing one or more webs of the unprinted electrophotographically printable film which are preferably unwound from one or more reels;

(m-2) moving the web(s) of the unprinted electrophotographically printable film in a longitudinal direction;

(m-3) converting the web(s) of unprinted electrophotographically printable film into a pouch precursor web having a desired shape by folding and/or stacking the web(s) with the toner-receiving layer (b) as outer layers of the pouch precursor web;

(m-4) sealing the pouch precursor web to obtain a web of pouches;

(m-5) cutting off the pouches from the web; and (m-6) optionally stacking the pouches, wherein one or more of steps (m-3) to (m-5) further optionally comprises integrating one or more features selected from a window, reclosable means; a Euro hole; a tear notch; perforations; a thin valve; and an opening for spouts or valves into a single pouch shape of the pouch precursor web.

18. A method for printing an unprinted electrophotographically printable fillable pouch according to claim 2 comprising the step of dry-toner based electrophotographic printing at least one main surface of the pouch.

* * * * *